US010106143B2

(12) United States Patent
Ogawa

(10) Patent No.: US 10,106,143 B2
(45) Date of Patent: *Oct. 23, 2018

(54) CONTROL APPARATUS FOR HYBRID VEHICLE

(71) Applicant: TOYOTA JIDOSHA KABUSHIKI KAISHA, Toyota-shi (JP)

(72) Inventor: Yuki Ogawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,272

(22) Filed: Jul. 20, 2016

(65) Prior Publication Data

US 2017/0021820 A1 Jan. 26, 2017

(30) Foreign Application Priority Data

Jul. 22, 2015 (JP) .................................. 2015-145353

(51) Int. Cl.
*B60W 20/12* (2016.01)
*B60L 11/18* (2006.01)
(Continued)

(52) U.S. Cl.
CPC ............. *B60W 20/12* (2016.01); *B60K 6/445* (2013.01); *B60L 7/18* (2013.01); *B60L 11/1861* (2013.01);
(Continued)

(58) Field of Classification Search
CPC .... B60L 11/1861; B60L 7/18; B60L 15/2045; B60L 2240/642; B60W 2550/20;
(Continued)

(56) References Cited

U.S. PATENT DOCUMENTS 5,778,326 A * 7/1998 Moroto .................. B60K 6/485
180/65.26
6,131,680 A 10/2000 Nii et al.
(Continued)

FOREIGN PATENT DOCUMENTS

EP  2 847 054 A1   3/2015
JP  9-308012 A    11/1997
(Continued)

OTHER PUBLICATIONS

Office Action dated Aug. 24, 2017 in U.S. Appl. No. 15/216,033.
(Continued)

*Primary Examiner* — Atul Trivedi
(74) *Attorney, Agent, or Firm* — Oblon, McClelland, Maier & Neustadt, L.L.P.

(57) ABSTRACT

A control apparatus that is applied to a vehicle includes a control unit. The control unit is configured to, when the vehicle is traveling on a specific traffic congestion section at a time when the vehicle has reached a downhill control start point or a traffic congestion control start point, not start any of a downhill control and a traffic congestion control. After the vehicle travels on the specific traffic congestion section, the downhill control or the traffic congestion control is started only when an effect of improvement in fuel consumption resulting from the downhill control or the traffic congestion control is expected.

12 Claims, 10 Drawing Sheets

(51) Int. Cl.
  *B60W 10/26* (2006.01)
  *B60L 7/18* (2006.01)
  *B60W 10/06* (2006.01)
  *B60W 10/08* (2006.01)
  *B60K 6/445* (2007.10)
  *B60W 30/18* (2012.01)
  *B60W 20/14* (2016.01)
  *B60W 50/00* (2006.01)
  *B60L 15/20* (2006.01)

(52) U.S. Cl.
  CPC ......... *B60L 15/2045* (2013.01); *B60W 10/06* (2013.01); *B60W 10/08* (2013.01); *B60W 10/26* (2013.01); *B60W 20/14* (2016.01); *B60W 30/18018* (2013.01); *B60W 30/18127* (2013.01); *B60W 50/0097* (2013.01); *B60L 2240/642* (2013.01); *B60W 2550/142* (2013.01); *B60W 2550/143* (2013.01); *B60W 2550/20* (2013.01); *B60W 2550/402* (2013.01); *B60W 2710/244* (2013.01); *Y02T 10/6239* (2013.01); *Y02T 10/6291* (2013.01); *Y02T 10/645* (2013.01); *Y02T 10/705* (2013.01); *Y02T 10/7005* (2013.01); *Y02T 10/7044* (2013.01); *Y02T 10/72* (2013.01); *Y02T 10/7283* (2013.01); *Y02T 10/7291* (2013.01); *Y02T 90/16* (2013.01)

(58) Field of Classification Search
  CPC ..... B60W 2550/142; B60W 2550/143; B60W 2550/402; B60W 10/06; B60W 10/08; B60W 10/26; B60W 30/18018; B60W 30/18127; B60W 2710/244; B60W 20/12; B60W 20/14; B60W 50/0097; B60K 6/445
  USPC .......................................................... 701/22
  See application file for complete search history.

(56) References Cited

U.S. PATENT DOCUMENTS

| | | | | |
|---|---|---|---|---|
| 2007/0294026 | A1* | 12/2007 | Schirmer | B60W 10/06 701/533 |
| 2008/0262668 | A1 | 10/2008 | Yamada | |
| 2008/0319596 | A1* | 12/2008 | Yamada | B60K 6/442 701/22 |
| 2008/0319597 | A1* | 12/2008 | Yamada | B60K 6/46 701/22 |
| 2009/0314563 | A1* | 12/2009 | Burkholder | B60K 6/445 180/65.265 |
| 2010/0084211 | A1 | 4/2010 | Seidel et al. | |
| 2010/0241297 | A1 | 9/2010 | Aoki et al. | |
| 2010/0324752 | A1 | 12/2010 | Suganuma et al. | |
| 2011/0017529 | A1 | 1/2011 | Durney | |
| 2011/0174561 | A1 | 7/2011 | Bowman | |
| 2012/0032637 | A1* | 2/2012 | Kotooka | B60K 6/46 320/109 |
| 2012/0197472 | A1 | 8/2012 | He et al. | |
| 2013/0015860 | A1* | 1/2013 | Crombez | G01R 31/36 324/433 |
| 2013/0066493 | A1* | 3/2013 | Martin | B60W 20/00 701/22 |
| 2013/0296102 | A1* | 11/2013 | Banker | B60W 10/196 477/4 |
| 2015/0019057 | A1* | 1/2015 | Morisaki | B60L 7/18 701/22 |
| 2015/0073637 | A1 | 3/2015 | Lennevi et al. | |
| 2015/0298680 | A1* | 10/2015 | Matthews | B60W 20/00 701/22 |
| 2016/0167641 | A1* | 6/2016 | Yoon | B60W 20/13 701/22 |
| 2016/0368481 | A1* | 12/2016 | Nuber | B60W 30/188 |
| 2017/0021730 | A1 | 1/2017 | Ogawa | |
| 2017/0021823 | A1* | 1/2017 | Ogawa | B60W 20/12 |
| 2017/0028980 | A1* | 2/2017 | Ogawa | B60K 6/445 |
| 2017/0028981 | A1* | 2/2017 | Ogawa | B60K 6/445 |
| 2017/0088117 | A1 | 3/2017 | Ogawa | |

FOREIGN PATENT DOCUMENTS

| | | |
|---|---|---|
| JP | 2000-134719 A | 5/2000 |
| JP | 2003-9310 | 1/2003 |
| JP | 2004-101245 A | 4/2004 |
| JP | 2004-248455 A | 9/2004 |
| JP | 2005-160269 A | 6/2005 |
| JP | 2007-223404 | 9/2007 |
| JP | 2008-279803 A | 11/2008 |
| JP | 2009-126450 A | 6/2009 |
| JP | 2010-6216 A | 1/2010 |
| JP | 2011-006047 A | 1/2011 |
| JP | 2013-119317 A | 6/2013 |
| JP | 2013-154715 A | 8/2013 |
| JP | 2013-154718 A | 8/2013 |
| JP | 2013-154720 A | 8/2013 |
| JP | 2014-24487 A | 2/2014 |
| JP | 2015-19521 | 1/2015 |
| JP | 2015-73420 | 4/2015 |
| WO | WO 2009/118624 A1 | 10/2009 |

OTHER PUBLICATIONS

Supplemental Notice of Allowance dated Aug. 18, 2017 in U.S. Appl. No. 15/244,411.
Notice of Allowance dated Dec. 4, 2017, in U.S. Appl. No. 15/224,245.
U.S. Office Action issued in U.S. Appl. No. 15/215,141 dated Nov. 30, 2017.
Office Action dated Jan. 9, 2018, in U.S. Appl. No. 15/219,927.
Notice of Allowance dated Mar. 26, 2018, in U.S. Appl. No. 15/216,033.
U.S. Office Action dated May 8, 2018, issued in U.S. Appl. No. 15/215,141.
Notice of Allowance dated Jun. 15, 2018, issued in U.S. Appl. No. 15/224,245.
Notice of Allowance issued in U.S. Appl. No. 15/215,141 dated Aug. 3, 2018.
Final Office Action issued in U.S. Appl. No. 15/219,927 dated Jul. 5, 2018.

* cited by examiner

… … … … … … … … … … … … … … … … … … … … … … … … … … … … … … … … … … … … … … …

CONTROL APPARATUS FOR HYBRID VEHICLE

CROSS-REFERENCE TO RELATED APPLICATIONS

This application is based upon and claims the benefit of priority from Japanese Patent Application No. 2015-145353, filed on Jul. 22, 2015, the entire contents of which are incorporated herein by reference in entirety.

BACKGROUND OF THE DISCLOSURE

1. Field of the Disclosure

The present application relates to a control apparatus for a hybrid vehicle including both an internal combustion engine and an electric motor as drive sources of the vehicle.

2. Description of Related Art

There is known a hybrid vehicle (hereinafter, also simply referred to as vehicle) including both an internal combustion engine (hereinafter, also simply referred to as engine) and an electric motor as drive sources of the vehicle. The vehicle includes a storage battery. The storage battery supplies electric power to the electric motor, and is charged by using the output power of the engine.

In addition, when the rotation of an axle is transmitted to the electric motor, the electric motor generates electric power (that is, a generator generates electric power), and the storage battery is also charged with the generated electric power. That is, the kinetic energy of the vehicle is converted to electric energy, and the electric energy is recovered by the storage battery. This conversion of energy is also referred to as regeneration. When regeneration is performed, braking force (torque that decelerates a vehicle speed) of the vehicle, which is generated by the electric motor, is also referred to as regenerative braking force.

It is possible to improve the fuel consumption (fuel consumption rate) of the vehicle by recovering part of energy, consumed by the engine or the electric motor during acceleration and constant speed traveling of the vehicle, through regeneration during deceleration and storing the part of the energy in the storage battery. While the vehicle is traveling, the remaining amount of charge SOC (state of charge; hereinafter; also simply referred to as SOC) of the storage battery fluctuates.

When an increase and decrease in the remaining amount of charge SOC are repeated in any one of a state where the remaining amount of charge SOC is high and a state where the remaining amount of charge SOC is low, degradation of the storage battery is facilitated. For this reason, while the vehicle is traveling; the control apparatus for a vehicle keeps the remaining amount of charge SOC between a predetermined upper limit remaining amount of charge and a predetermined lower limit remaining amount of charge.

Incidentally, when the vehicle travels on a downhill section, the vehicle continues accelerating even when the engine and the electric motor generate no torque (driving force). Therefore, a driver of the vehicle releases the foot from an accelerator pedal and, where necessary, depresses a brake pedal to require braking force from the vehicle. At this time, the vehicle suppresses an increase in vehicle speed by the use of regenerative braking force and increases the remaining amount of charge SOC.

As the remaining amount of charge SOC increases, that is, as the amount of electric power that is charged in the storage battery increases; the distance that the vehicle is allowed to travel by using only the output power of the electric motor while the operation of the engine is stopped extends. Therefore, if the remaining amount of charge SOC is increased as much as possible within the range in which the remaining amount of charge SOC is lower than the upper limit remaining amount of charge when the vehicle travels on a downhill section, it is possible to further improve the fuel consumption of the vehicle.

However, if a downhill section is long, the remaining amount of charge SOC reaches the upper limit remaining amount of charge, so it is not possible to increase the remaining amount of charge SOC any more. Therefore; the effect of improvement in fuel consumption, which is obtained when the vehicle travels on a downhill section, increases as the difference between the upper limit remaining amount of charge and the remaining amount of charge SOC at the start point of the downhill section increases.

One of existing drive control apparatuses (hereinafter, also referred to as existing apparatus) increases the upper limit remaining amount of charge and decreases the lower limit remaining amount of charge when there is a downhill section having a predetermined altitude difference in a travel route. In addition, the existing apparatus gives a higher priority to traveling with the use of the electric motor than to traveling with the use of the engine such that the remaining amount of charge SOC approaches the decreased lower limit remaining amount of charge as much as possible by the time the vehicle enters the downhill section (see, for example, Japanese Patent Application Publication No. 2005-160269 (JP 2005-160269 A)). Therefore, with the existing apparatus, when a downhill section is included in a travel route, it is possible to improve the fuel consumption of the vehicle.

Generally, when the output power of the engine is small, the operation efficiency of the engine is low. For this reason, when the vehicle starts traveling or when the vehicle travels at a low speed, the control apparatus for a vehicle causes only the electric motor to generate output power while stopping the engine.

On the other hand, when the vehicle travels on a traffic congestion section, the vehicle travels at a low speed or the vehicle repeats traveling at a low speed and stopping. Therefore, when the vehicle travels on a traffic congestion section, the frequency at which the vehicle travels by using the output power of only the electric motor increases, and the amount of electric power that is recoverable through regenerative braking is not so large because the vehicle speed is low during regenerative braking. Therefore, the remaining amount of charge SOC decreases. In this way, if the remaining amount of charge SOC decreases in the case where the vehicle travels on a traffic congestion section and, as a result, the remaining amount of charge SOC reaches the lower limit remaining amount of charge, it is necessary to carry out forcible charging by using the output power of the engine, so there is a concern that the fuel consumption deteriorates.

The inventors studied this as follows. When there is a downhill section in a travel route, an actual remaining amount of charge is decreased in advance by decreasing a target remaining amount of charge, which is a target value of the remaining amount of charge of the storage battery, before entering the downhill section. Thus, it is possible to recover a larger amount of electric power in the downhill section. When a traffic congestion section is included in a travel route, an actual remaining amount of charge is increased in advance by increasing a target remaining amount of charge before entering the traffic congestion section. Thus, frequent forcible charging is prevented on the traffic congestion section.

However, for example, if the vehicle is traveling on a traffic congestion section at the time when the remaining amount of charge is intended to be decreased by decreasing the target remaining amount of charge in preparation for a downhill section, the vehicle is generally driven by using only the driving force of the electric motor without operating the engine. Therefore, the remaining amount of charge excessively decreases, with the result that forcible charging is performed and there is a concern that the fuel consumption deteriorates on the contrary. On the other hand, for example, if the vehicle is traveling on a traffic congestion section at the time when the remaining amount of charge is intended to be increased by increasing the target remaining amount of charge in preparation for a traffic congestion section, the frequency at which the engine is operated in a low load state having a low operation efficiency is increased in an attempt to increase the remaining amount of charge, and there is a concern that the fuel consumption deteriorates on the contrary.

SUMMARY

This disclosure addresses the above-described inconvenience. That is, it is an object of the disclosure to provide a control apparatus for a hybrid vehicle, which is able to avoid deterioration of fuel consumption of the vehicle as a result of executing downhill control and/or traffic congestion control.

A control apparatus for a hybrid vehicle according to a first aspect of the disclosure (hereinafter, also referred to as the apparatus) is applied to a hybrid vehicle. The hybrid vehicle includes an internal combustion engine that serves as a drive source of the vehicle, an electric motor that serves as a drive source of the vehicle, and a storage battery that supplies electric power to the electric motor. The hybrid vehicle is configured to perform regenerative braking with the use of the electric motor and be able to charge the storage battery with electric power generated through the regenerative braking. The hybrid vehicle is also configured to be able to charge the storage battery with electric power generated by using output power of the internal combustion engine.

The apparatus includes a control unit. The control unit is configured to control the internal combustion engine and the electric motor such that a required driving force that is required of the vehicle is satisfied and a remaining amount of charge of the storage battery approaches a target remaining amount of charge set to a normal remaining amount of charge. The control unit is configured to acquire information pertaining to a scheduled travel route of the vehicle, and execute at least one of downhill control and traffic congestion control.

The downhill control is control in which, when it is determined on the basis of the information pertaining to the scheduled travel route that a target downhill section that satisfies a predetermined downhill condition is included in the scheduled travel route, the target remaining amount of charge is changed to a first remaining amount of charge lower than the normal remaining amount of charge when the vehicle travels on a first section, the first section at least includes, within a section from a downhill control start point that is located a predetermined first distance before a start point of the downhill section included in the scheduled travel route to an end point of the downhill section, a section from the downhill control start point to the start point of the downhill section.

The traffic congestion control is control in which, when it is determined on the basis of the information pertaining to the scheduled travel route that a traffic congestion section that satisfies a predetermined traffic congestion condition is included in the scheduled travel route, the target remaining amount of charge is changed to a second remaining amount of charge higher than the normal remaining amount of charge when the vehicle travels on a second section, the second section is a section from a traffic congestion control start point that is located a predetermined second distance before a start point of the traffic congestion section included in the scheduled travel route to the start point of the traffic congestion section.

The control unit is configured to, when the vehicle is traveling on a specific traffic congestion section at the time when the vehicle has reached the downhill control start point or the traffic congestion control start point, not start any of the downhill control and the traffic congestion control, the specific traffic congestion section is a traffic congestion section different from the target traffic congestion section.

The remaining amount of charge of the storage battery is a value indicating the amount of electric power charged in the storage battery. For example, when the remaining amount of charge is lower than the target remaining amount of charge, the apparatus increases the amount of electric power that is generated by the electric motor by increasing the output power of the engine as compared to when the remaining amount of charge coincides with the target remaining amount of charge, thus increasing the remaining amount of charge. Alternatively, when the remaining amount of charge is higher than the target remaining amount of charge, the apparatus reduces the output power of the engine or stops the operation of the engine and further increases the output power of the electric motor as compared to when the remaining amount of charge coincides with the target remaining amount of charge, thus decreasing the remaining amount of charge.

With the apparatus, even when a traffic congestion section is included in the scheduled travel route of the vehicle, there is a high possibility that deterioration of fuel consumption is suppressed through traffic congestion control.

When there is a specific traffic congestion section in a section from the downhill control start point to the start point of the target downhill section, the remaining amount of charge decreases when the vehicle travels on the specific traffic congestion section. When downhill control is executed, the target remaining amount of charge decreases, so the rate of decrease in the remaining amount of charge increases, and there is a high possibility that the remaining amount of charge reaches a lower limit remaining amount of charge. When the remaining amount of charge reaches the lower limit remaining amount of charge, it is required to increase the amount of electric power that is generated by the electric motor by increasing the output power of the engine, so the fuel consumption of the vehicle deteriorates.

Alternatively, when there is a specific traffic congestion section in a section from the traffic congestion control start point to the start point of the target traffic congestion section, the target remaining amount of charge increases when traffic congestion control is executed, so the difference between the target remaining amount of charge and an actual remaining amount of charge increases. Therefore, the amount of electric power that is generated by using the output power of the engine is increased, with the result that the fuel consumption of the vehicle deteriorates.

Therefore, with the apparatus, the start of downhill control and the start of traffic congestion control are avoided while the vehicle is traveling on the specific traffic congestion section, so there is a high possibility that deterioration of the fuel consumption is avoided.

In one aspect of the apparatus, the control unit may be configured to execute the downhill control, and the control unit may be configured to, when the vehicle is traveling on the specific traffic congestion section at the time when the vehicle has reached the downhill control start point and the vehicle is not traveling on the specific traffic congestion section before the vehicle passes through the first section for the downhill control start point, start the downhill control when a position of the vehicle is located before the start point of the target downhill section, and prohibit execution of the downhill control when the position of the vehicle is not located before the start point of the target downhill section.

The apparatus according to this aspect is able to cause the vehicle to start traveling on the target downhill section in a state where an actual remaining amount of charge is kept low by decreasing the target remaining amount of charge through execution of downhill control after a decrease in the remaining amount of charge resulting from traveling on the specific traffic congestion section. Therefore, according to this aspect, when improvement in fuel consumption resulting from downhill control is expected after the vehicle travels on the specific traffic congestion section, downhill control is executed.

In another aspect of the apparatus, the control unit may be configured to execute the traffic congestion control, and the control unit may be configured to, when the vehicle is traveling on the specific traffic congestion section at the time when the vehicle has reached the traffic congestion control start point and when the vehicle is not traveling on the specific traffic congestion section before the vehicle passes through the second section for the traffic congestion control start point, start the traffic congestion control when the position of the vehicle is located a distance longer than a predetermined third distance before the start point of the target traffic congestion section, and prohibit execution of the traffic congestion control when the position of the vehicle is not located the distance longer than the third distance before the start point of the target traffic congestion section.

A control apparatus for a hybrid vehicle according to a second aspect of the disclosure includes an internal combustion engine that serves as a drive source of a vehicle; an electric motor that serves as a drive source of the vehicle and that performs regenerative braking; a storage battery that supplies electric power to the electric motor, that is charged with electric power generated through the regenerative braking and that is charged with electric power generated by using output power of the internal combustion engine; and a control unit configured to control the internal combustion engine and the electric motor such that a required driving force that is required of the vehicle is satisfied and a remaining amount of charge of the storage battery approaches a target remaining amount of charge set to a normal remaining amount of charge, wherein the control unit is configured to acquire information pertaining to a scheduled travel route of the vehicle, the control unit is configured to execute at least one of downhill control and traffic congestion control, the downhill control is control in which, when it is determined on the basis of the information pertaining to the scheduled travel route that a target downhill section that satisfies a predetermined downhill condition is included in the scheduled travel route, the target remaining amount of charge is changed to a first remaining amount of charge lower than the normal remaining amount of charge when the vehicle travels on a first section, the first section at least includes, within a section from a downhill control start point that is located a predetermined first distance before a start point of the downhill section included in the scheduled travel route to an end point of the downhill section, a section from the downhill control start point to the start point of the downhill section, the traffic congestion control is control in which, when it is determined on the basis of the information pertaining to the scheduled travel route that a traffic congestion section that satisfies a predetermined traffic congestion condition is included in the scheduled travel route, the target remaining amount of charge is changed to a second remaining amount of charge higher than the normal remaining amount of charge when the vehicle travels on a second section, the second section is a section from a traffic congestion control start point that is located a predetermined second distance before a start point of the traffic congestion section included in the scheduled travel route to the start point of the traffic congestion section, and the control unit is configured to, when the vehicle is traveling on a specific traffic congestion section at the time when the vehicle has reached the downhill control start point or the traffic congestion control start point, not start any of the downhill control and the traffic congestion control, the specific traffic congestion section is a traffic congestion section different from the target traffic congestion section.

The apparatus according to this aspect executes traffic congestion control when deterioration of fuel consumption resulting from an increase in the output power of the engine is avoided while the vehicle is traveling on the specific traffic congestion section and then an increase in the remaining amount of charge is expected as a result of traffic congestion control by the time the vehicle enters the target traffic congestion section. On the other hand, the apparatus does not execute traffic congestion control when the distance from the end of traveling on the specific traffic congestion section to entry into the target traffic congestion section is short. As a result, the target remaining amount of charge increases only in a short time while the vehicle is traveling on a section between these traffic congestion sections, and the output power of the engine is increased only in a short time in order to increase the amount of electric power to be generated, with the result that a feeling of strangeness that is experienced by a driver of the vehicle is avoided as much as possible.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Configuration

Figure 1:
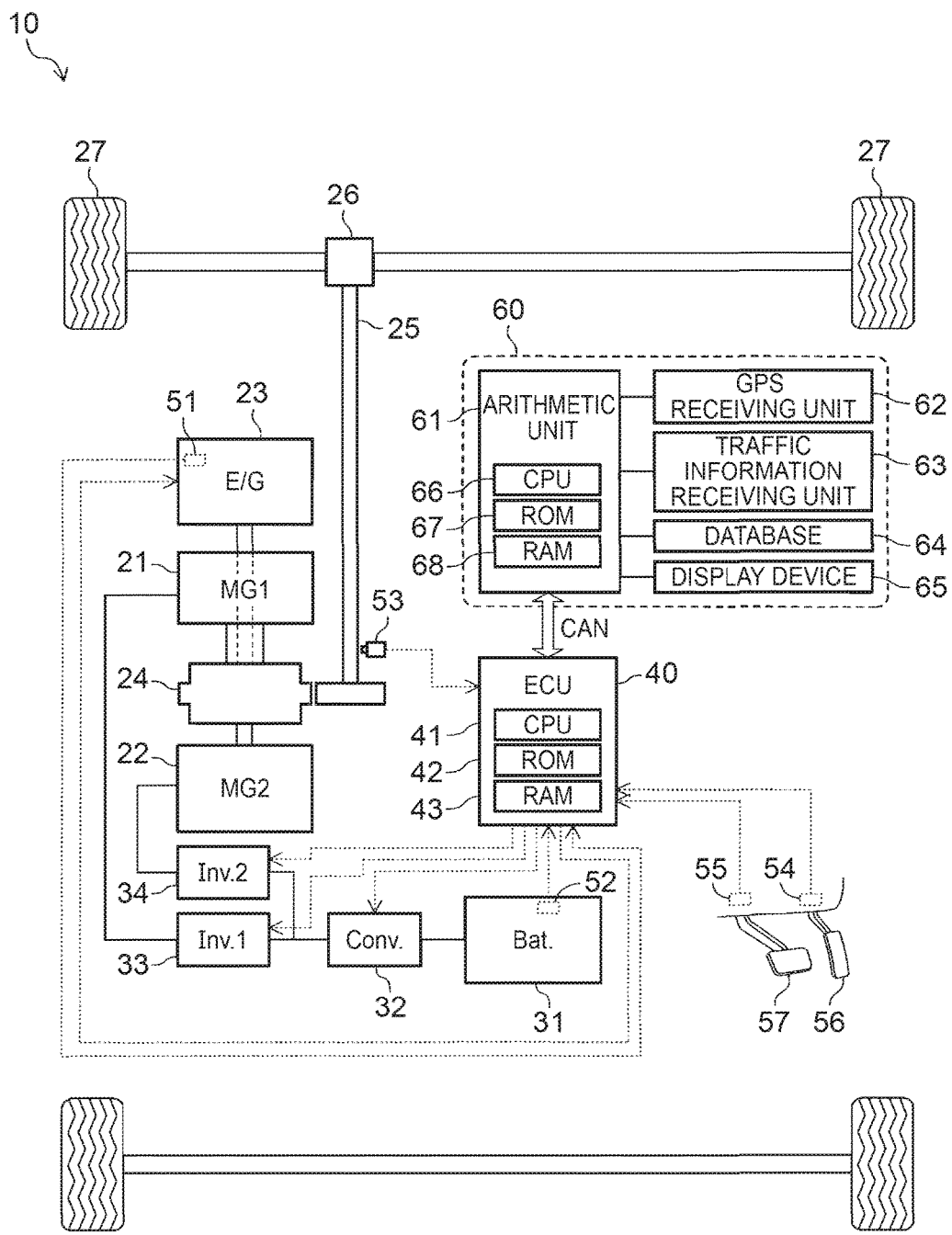
FIG. 1 is a schematic view of a vehicle (the vehicle) to which a control apparatus (the control apparatus) for a storage battery according to an embodiment of the disclosure is applied.

Hereinafter, a control apparatus (hereinafter, also referred to as the control apparatus) for a hybrid vehicle according to an embodiment of the disclosure will be described with reference to the accompanying drawings. FIG. 1 is a schematic view that shows the schematic configuration of a vehicle 10 to which the control apparatus is applied. The vehicle 10 includes a first electric motor 21, a second electric motor 22 and an engine 23. That is, the vehicle 10 is a hybrid vehicle.

The vehicle 10 further includes a power split mechanism 24, a storage battery 31, a step-up converter 32, a first inverter 33, a second inverter 34, an ECU 40 and an operation support system 60. The ECU 40 and the operation support system 60 constitute the control apparatus.

Each of the first electric motor 21 and the second electric motor 22 includes a stator and a rotor. The stator includes three-phase coils that generate revolving magnetic fields. The rotor includes permanent magnets that generate torque by using magnetic force between the permanent magnets and the revolving magnetic fields. Each of the first electric motor 21 and the second electric motor 22 is able to operate as not only an electric motor but also a generator.

The first electric motor 21 is mainly used as a generator. In addition, the first electric motor 21 cranks the engine 23 at a startup of the engine 23. The second electric motor 22 is mainly used as an electric motor. The second electric motor 22 is able to generate the driving force of the vehicle 10 (torque for propelling the vehicle). The engine 23 is also able to generate the driving force of the vehicle 10. The engine 23 is a four-cylinder four-cycle gasoline engine.

The power split mechanism 24 is a planetary gear mechanism. The power split mechanism 24 includes a ring gear, a plurality of power split planetary gears, a plurality of reduction planetary gears, a first sun gear, a second sun gear, a first planetary carrier and a second planetary carrier.

The power split planetary gears and the reduction planetary gears each are in mesh with the ring gear. The first sun gear is in mesh with the power split planetary gears. The second sun gear is in mesh with the reduction planetary gears. The first planetary carrier supports the plurality of power split planetary gears such that the power split planetary gears are rotatable and revolvable around the sun gear. The second planetary carrier supports the plurality of reduction planetary gears such that the reduction planetary gears are rotatable.

The ring gear is connected to an axle 25 via a counter gear such that torque can be transmitted. The counter gear is arranged on the outer periphery of the ring gear. The output shaft of the engine 23 is coupled to the first planetary carrier such that torque can be transmitted. The output shaft of the first electric motor 21 is coupled to the first sun gear such that torque can be transmitted. The output shaft of the second electric motor 22 is coupled to the second sun gear such that torque can be transmitted.

Figure 2:
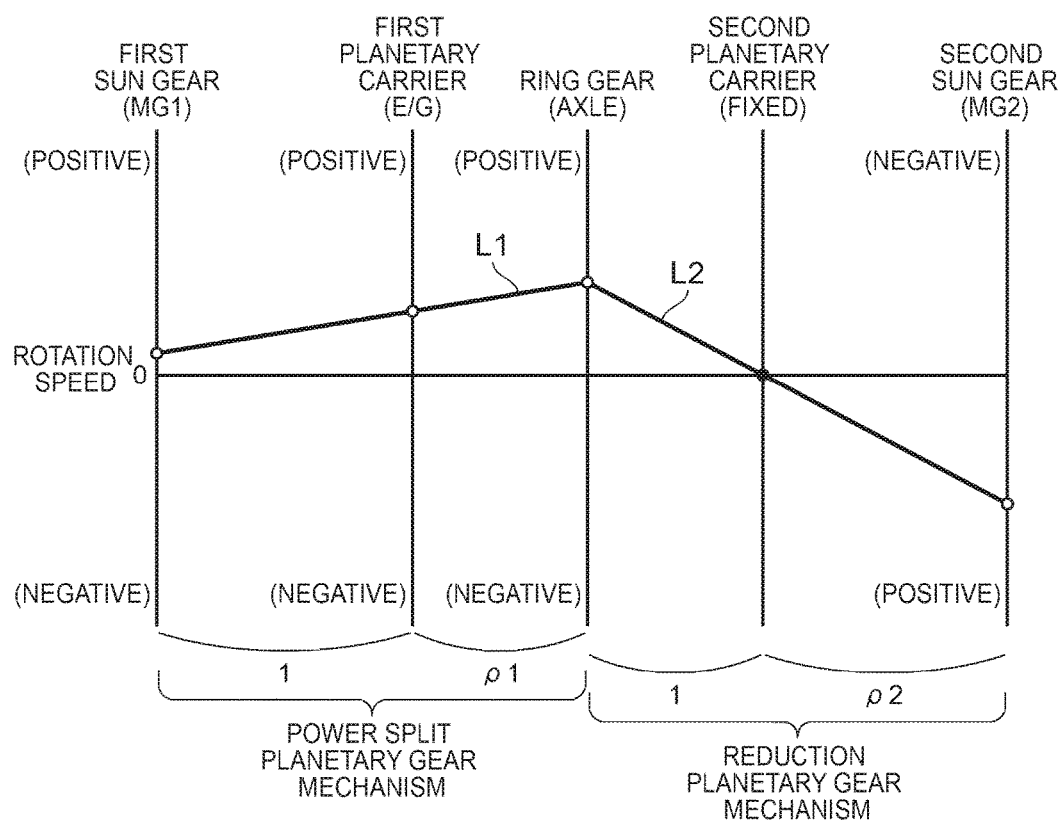
FIG. 2 is a nomograph that shows the relationship in rotation speed among a first electric motor, a second electric motor, an engine and a ring gear.

The relationship among the rotation speed (MG1 rotation speed) Nm1 of the first electric motor 21, the engine rotation speed NE of the engine 23 and the ring gear rotation speed Nr of the power split mechanism 24 and the relationship between the rotation speed (MG2 rotation speed) Nm2 of the second electric motor 22 and the ring gear rotation speed Nr are represented by a known nomograph shown in FIG. 2. The two straight lines shown in the nomograph are also referred to as an operation common line L1 and an operation common line L2.

According to the operation common line L1, the relationship among the MG1 rotation speed Nm1, the engine rotation speed NE and the ring gear rotation speed Nr is expressed by the following mathematical expression (1). Here, a gear ratio ρ1 is the number of teeth of the first sun gear to the number of teeth of the ring gear (that is, ρ1=Number of teeth of the first sun gear/Number of teeth of the ring gear).

$$Nm1=Nr-(Nr-NE)\times(1+\rho1)/\rho1 \qquad (1)$$

On the other hand, according to the operation common line L2, the relationship between the MG2 rotation speed Nm2 and the ring gear rotation speed Nr is expressed by the following mathematical expression (2). Here, a gear ratio ρ2 is the number of teeth of the second sun gear to the number of teeth of the ring gear (that is, ρ2=Number of teeth of the second sun gear/Number of teeth of the ring gear).

$$Nm2=Nr\times(1+\rho2)/\rho2-Nr \qquad (2)$$

Referring back to FIG. 1, the axle 25 is coupled to drive wheels 27 via a differential gear 26 such that torque can be transmitted.

The storage battery 31 is a chargeable and dischargeable secondary battery (lithium ion battery in the present embodiment). Direct-current power output from the storage battery 31 is converted (stepped up) in voltage by the step-up converter 32 into high-voltage electric power. The first inverter 33 converts the high-voltage electric power to alternating-current power, and supplies the alternating-current power to the first electric motor 21. Similarly, the second inverter 34 converts the high-voltage electric power to alternating-current power, and supplies the alternating-current power to the second electric motor 22.

On the other hand, when the first electric motor 21 operates as a generator, the first inverter 33 converts generated alternating-current power to direct-current power, and supplies the direct-current power to the step-up converter 32 and/or the second inverter 34. Similarly, when the second electric motor 22 operates as a generator, the second inverter 34 converts generated alternating-current power to direct-current power, and supplies the direct-current power to the step-up converter 32 and/or the first inverter 33. The step-up converter 32 steps down the direct-current power supplied from the first inverter 33 and/or the second inverter 34, and supplies the stepped-down direct-current power to the storage battery 31. As a result, the storage battery 31 is charged.

The ECU 40 is a microcomputer including a CPU 41, a ROM 42, a RAM 43, and the like. The ROM 42 stores programs that are executed by the CPU 41, look-up tables (maps), and the like. The RAM 43 temporarily stores data. The ECU 40 controls the engine 23, the step-up converter 32 the first inverter 33 and the second inverter 34.

The ECU 40 is connected to a crank angle sensor 51, an ammeter 52, a vehicle speed sensor 53, an accelerator operation amount sensor 54 and a brake operation amount sensor 55.

The crank angle sensor 51 measures the rotation position of a crankshaft of the engine 23, and outputs a signal indicating a crank angle CA of the rotation position. The ECU 40 calculates the engine rotation speed NE of the engine 23 on the basis of the crank angle CA. The ammeter 52 outputs a signal indicating a current IB flowing through the storage battery 31. The ECU 40 calculates a remaining amount of charge SOC on the basis of the current IB. The remaining amount of charge SOC is the amount of electric power charged in the storage battery 31.

The vehicle speed sensor 53 detects the rotation speed of the axle 25, and outputs a signal indicating the travel speed (vehicle speed) Vs of the vehicle 10. The accelerator operation amount sensor 54 outputs a signal indicating the operation amount accelerator operation amount) Ap of an accelerator pedal 56. The brake operation amount sensor 55 outputs a signal indicating the operation amount (brake operation amount) Bp of a brake pedal 57.

The operation support system 60 includes an arithmetic unit 61, a GPS receiving unit 62, a traffic information receiving unit 63, a database 64 and a display device 65. The GPS receiving unit 62 acquires the current position Pn of the vehicle 10 on the basis of signals (radio waves) from global positioning system (GPS) satellites, and outputs a signal indicating the current position Pn to the arithmetic unit 61. The traffic information receiving unit 63 receives information, such as traffic congestion information and speed regulation, around the current position Pn. The information is provided by the vehicle information and communication system (VICS (trademark)) via electric wave beacon and FM multiplex broadcasting.

The database 64 is formed of a hard disk drive (HDD), and stores a map database. The map database includes information (map information) pertaining to nodes, such as traffic intersections and dead ends, links that connect the nodes with each other, and facilities, such as buildings and parking lots along the links. In addition, the map database includes the distance of a section (road) represented by each link, the position coordinates of each of the nodes that are represented as one end (start position) and the other end (end position) of each link, and average gradients (the ratios of altitude difference between both ends of each link to the distance between both ends of the link).

The display device 65 is arranged in a center console provided in the cabin of the vehicle 10. The display device 65 includes a display, and is able to display the map information stored in the map database together with the current position Pn in response to a driver's operation of the vehicle 10.

The display of the display device 65 also works as a touch panel. Therefore, the driver is allowed to operate the operation support system 60 by touching the display of the display device 65. In addition, the display device 65 includes a sounding device. The display device 65 is able to reproduce warning sound, announcement, and the like, in accordance with a command from the arithmetic unit 61.

The arithmetic unit 61 is a microcomputer including a CPU 66, a ROM 67, a RAM 68, and the like. The ROM 67 stores programs that are executed by the CPU 66, look-up tables (maps), and the like. The RAM 68 temporarily stores data. The arithmetic unit 61 is able to exchange information with the ECU 40 each other via a controller area network (CAN). The arithmetic unit 61 is also referred to as operation support ECU. The ECU 40 is also referred to as vehicle control ECU.

When the driver of the vehicle 10 inputs a destination with the use of the display device 65, the arithmetic unit 61 searches the map database for a route (scheduled travel route) from the current position Pn to the destination. The scheduled travel route is formed of a set of nodes. The arithmetic unit 61 guides the driver along the scheduled travel route by the use of the display on the display device 65 and the voice that is output from the sounding device.

Control Over Generated Torque by ECU

Next, the operation of the ECU 40 will be described. When the driver of the vehicle 10 requires torque that acts on the drive wheels 27 from the vehicle 10, the driver increases the accelerator operation amount Ap. The ECU 40 determines a required ring gear torque Tr* on the basis of the accelerator operation amount Ap and the vehicle speed Vs. The required ring gear torque Tr* is a target value of the torque (ring gear generating torque) Tr that acts on the ring gear. The ring gear generating torque Tr is in a linear relationship with the torque that acts on the drive wheels 27, so the torque that acts on the drive wheels 27 increases as the ring gear generating torque Tr increases.

The ECU 40 controls the engine 23, the step-up converter 32, the first inverter 33 and the second inverter 34 such that the ring gear generating torque Tr is equal to the required ring gear torque Tr* and the remaining amount of charge SOC coincides with a target remaining amount of charge SOC*.

For example, when the remaining amount of charge SOC substantially coincides with the target remaining amount of charge SOC*, and in an operation region in which the operation efficiency of the engine 23 is high, the ECU 40 causes both the engine 23 and the second electric motor 22 to generate output power, and the first electric motor 21 generates electric power by using part of engine power Pe that is generated by the engine 23. In this case, electric power generated by the first electric motor 21 is supplied to the second electric motor 22. Therefore, the remaining amount of charge SOC is kept at the target remaining amount of charge SOC*.

When the remaining amount of charge SOC is lower than the target remaining amount of charge SOC*, the ECU 40 increases the engine power Pe to thereby increase the amount of electric power that is generated by the first electric motor 21. Thus, the remaining amount of charge SOC increases.

On the other hand, in an operation region in which the operation efficiency of the engine 23 is low, for example, when the vehicle 10 starts moving or when the vehicle travels at a low load, the ECU 40 stops the operation of the engine 23, and causes only the second electric motor 22 to generate output power. In this case, the remaining amount of charge SOC decreases. However, when the remaining amount of charge SOC is lower than a lower limit remaining amount of charge Smin, the ECU 40 causes the engine 23 to operate, and carries out forcible charging for causing the first electric motor 21 to generate electric power.

When the remaining amount of charge SOC is higher than an upper limit remaining amount of charge Smax, the ECU 40 stops the operation of the engine 23 even in the operation region in which the operation efficiency of the engine 23 is high, and causes only the second electric motor 22 to generate output power.

Control Over Braking Force by ECU

When the driver requires braking force from the vehicle 10, the driver performs an operation to set both the accelerator operation amount Ap and the brake operation amount Bp to zero or an operation to increase the brake operation amount Bp. When braking force is required, the ECU 40 generates regenerative braking force and/or friction braking force.

When regenerative braking force is generated, the ECU 40 causes the first electric motor 21 and/or the second electric motor 22 to generate electric power. In other words, the ECU 40 converts the kinetic energy of the vehicle 10 to electric energy with the use of the first electric motor 21 and/or the second electric motor 22. The generated electric power is charged into the storage battery 31, with the result that the remaining amount of charge SOC increases.

When friction braking force is generated, the ECU 40 applies friction force to a brake disk with the use of a brake device. The brake disk is arranged in each of the wheels of the vehicle 10, including the drive wheels 27. In other words, the ECU 40 converts the kinetic energy of the vehicle 10 to thermal energy with the use of each brake device.

The ECU 40 controls the first electric motor 21, the second electric motor 22 and the brake devices such that a total braking force that is the sum of the regenerative braking force and the friction braking force is equal to a braking force that is required by the driver.

Downhill Control

When the vehicle 10 travels on a downhill section, unless the vehicle 10 generates braking force, the vehicle speed Vs increases even when no torque is generated in the drive wheels 27. When the vehicle speed Vs becomes higher than a speed expected by the driver, the driver requires braking force. Part or all of the required braking force is provided by regenerative braking force. Therefore, while the vehicle is traveling on a downhill section, the frequency at which the first electric motor 21 and/or the second electric motor 22 generates electric power increases, with the result that the remaining amount of charge SOC increases. In other words, the ECU 40 converts the potential energy of the vehicle 10 to electric energy via kinetic energy.

When the remaining amount of charge SOC increases, there is a reduced opportunity to operate the engine 23 in order to charge the storage battery 31, so the fuel consumption of the vehicle 10 improves. However, when the remaining amount of charge SOC reaches the upper limit remaining amount of charge Smax in the middle of a downhill section, it is not possible to increase the remaining amount of charge SOC any more, so the effect of improvement in fuel consumption is not obtained any more.

Figure 3:
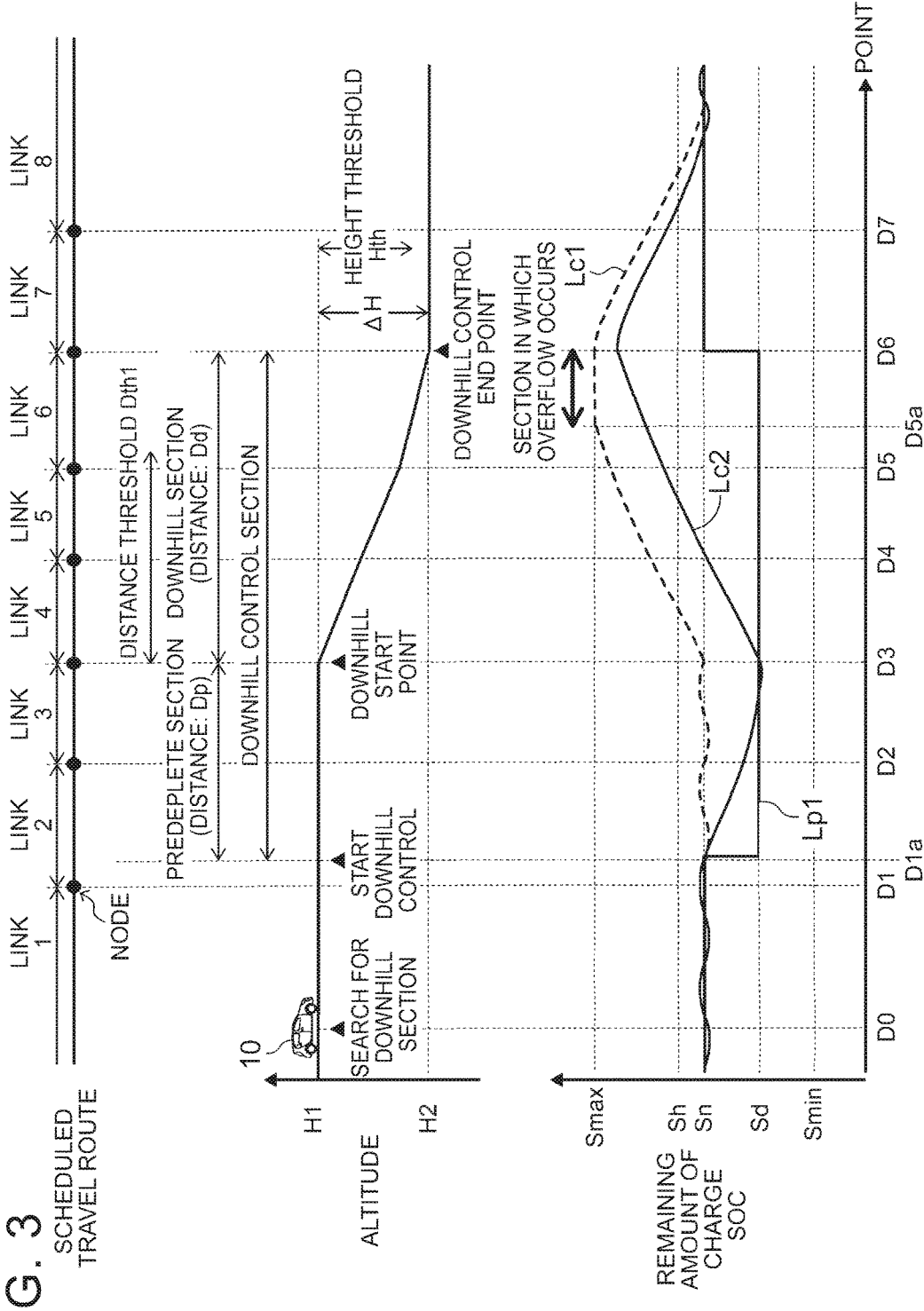
FIG. 3 is a graph that shows a change in remaining amount of charge when the vehicle travels on a downhill section.

A change in the remaining amount of charge SOC at the time when the vehicle 10 travels on a downhill section will be described with reference to FIG. 3. In FIG. 3, links that constitute the scheduled travel route of the vehicle 10 are shown as link 1 to link 8 for the sake of convenience. The current position Pn is in link 1. Link 4 to link 6 correspond to a downhill section. On the other hand, link 1 to link 3, link 7, and link 8 correspond to a flat road. When downhill control (described later) is not executed, the target remaining amount of charge SOC* is set to a normal remaining amount of charge Sn.

A curve Lc1 (dashed line) indicates a change in the remaining amount of charge SOC when the vehicle 10 has travelled from link 1 to link 8 without executing downhill control. When the vehicle 10 travels along link 1 to link 3, the remaining amount of charge SOC fluctuates near the normal remaining amount of charge Sn. As the vehicle 10 enters the section corresponding to link 4, the remaining amount of charge SOC starts increasing. When the vehicle 10 has reached point D5a in the middle of link 6, the remaining amount of charge SOC reaches the upper limit remaining amount of charge Smax.

Therefore, while the vehicle 10 is traveling on a section from point D5a to point D6, it is not possible to increase the remaining amount of charge SOC (that is, overflow occurs) although the vehicle 10 is traveling on the downhill section, with the result that the effect of improvement in fuel consumption is not sufficiently obtained. In addition, as a time during which the remaining amount of charge SOC is kept near the upper limit remaining amount of charge Smax extends, degradation of the storage battery 31 is facilitated.

The ECU 40 of the vehicle 10 executes downhill control for decreasing the target remaining amount of charge SOC* by a predetermined amount (the amount of electric power S10) before the downhill section. When downhill control is executed, the target remaining amount of charge SOC* is set to a low remaining amount of charge Sd. In this example, the difference between the normal remaining amount of charge Sn and the low remaining amount of charge Sd is equal to the amount of electric power S10 corresponding to 10% of the maximum amount of charge (that is, the amount of stored electric power at the time when the remaining amount of charge SOC is 100%) of the storage battery 31 (that is, Sd=Sn−S10). The low remaining amount of charge Sd is also referred to as first remaining amount of charge for the sake of convenience.

Downhill control is started at the time when the vehicle 10 has reached point D1a that is located a predetermined predeplete distance Dp before the start point D3 of the downhill section. On the other hand, downhill control ends at the time when the vehicle 10 has reached the end point (point D6) of the downhill section, and the target remaining amount of charge SOC* is changed from the low remaining amount of charge Sd to the normal remaining amount of charge Sn. A change in the target remaining amount of charge SOC* when downhill control is executed is shown by a polygonal line Lp1.

A section including the downhill section and a predeplete section is also referred to as downhill control section. The predeplete section is a section from the point that is located the predeplete distance Dp before the start point of the downhill section to the start point of the downhill section. The predeplete distance Dp is a preset distance. When the vehicle 10 has travelled that distance, it is a sufficient distance to gradually reduce the remaining amount of charge SOC by the amount of electric power S10.

A change in the remaining amount of charge SOC when downhill control is executed is shown by a curve Lc2 (continuous line). As is understood from the curve Lc2, when the target remaining amount of charge SOCK becomes the low remaining amount of charge Sd, the remaining amount of charge SOC reduces and reaches near the low remaining amount of charge Sd. After that, when the vehicle 10 travels on the downhill section, the remaining amount of charge SOC increases as a result of regenerative braking.

However, the vehicle 10 ends traveling on the downhill section without the remaining amount of charge SOC reaching the upper limit remaining amount of charge Smax. That is, it is possible to avoid occurrence of the overflow through downhill control.

When the vehicle 10 has reached the start point of the downhill control section, the ECU 40 receives a notification from the operation support system 60 (specifically, the arithmetic unit 61) that downhill control should be started. At this time, a process that is executed by the arithmetic unit 61 will be described later. Similarly, when the vehicle 10 has reached the end point of the downhill control section, the ECU 40 receives a notification from the arithmetic unit 61 that downhill control should be ended. The ECU 40 starts downhill control and, after that, ends downhill control in accordance with these notifications received from the arithmetic unit 61.

The downhill section that is a target of downhill control (target downhill section) is a downhill section in which the amount of electric power that is generated by the first electric motor 21 and/or the second electric motor 22 is estimated to be larger than the amount of electric power S20 corresponding to 20% of the maximum amount of charge of the storage battery 31 as a result of the above-described conversion from the potential energy to the electric energy. In this example, the target downhill section is a downhill section in which the distance between the start point and end point of the downhill section is longer than a distance threshold Dth1, the altitude of the end point is lower than the altitude of the start point and the absolute value of the difference between the altitudes is larger than a height threshold Hth.

In the example shown in FIG. 3, the distance of the downhill section formed of link 4 to link 6 is Dd, and the distance Dd is longer than the distance threshold Dth1 (that is, Dd>Dth1). In addition, the altitude of the start point of the downhill section (that is, the start point of link 4) is H1, the altitude of the end point (that is, the end point of link 6) is H2, and an altitude difference $\Delta H$ between H1 and H2 is larger than the height threshold Hth (that is, $\Delta H$=H1−H2>Hth). Therefore, the downhill section formed of link 4 to link 6 corresponds to the target downhill section.

However, the length and gradient of each link are stored in the map database as described above, so the arithmetic unit 61 acquires the altitude difference between one end and the other end of each link by calculating the product of the length and the gradient. In addition, the arithmetic unit 61 acquires the altitude difference between one end and the other end of a section by calculating the sum of the altitude differences of a plurality of links that constitute the section. When the map database includes the altitudes of both ends of each link, the altitude difference is obtained by subtracting the altitude of the end point of a link from the altitude of the start point of the link.

Traffic Congestion Control

The vehicle speed Vs is lower when the vehicle 10 travels on a traffic congestion section than when there is no traffic congestion. Alternatively, when the vehicle 10 travels on a traffic congestion section, a stopped state (that is, a state where Vs=0) and a low-speed traveling state (a state where Vs>0) are alternately changed.

As described above, when the vehicle 10 starts moving or when the vehicle 10 travels at a low load, the ECU 40 stops the operation of the engine 23 and causes only the second electric motor 22 to generate output power. On the other hand, when the vehicle 10 travels on a traffic congestion section, the number of times the vehicle 10 decelerates and stops increases (that is, even when the frequency of execution of regenerative control is high), so the amount of electric power that is obtained through regenerative control decreases because the vehicle speed Vs is low. Therefore, when the vehicle 10 travels on a traffic congestion section, the remaining amount of charge SOC decreases.

Figure 4:
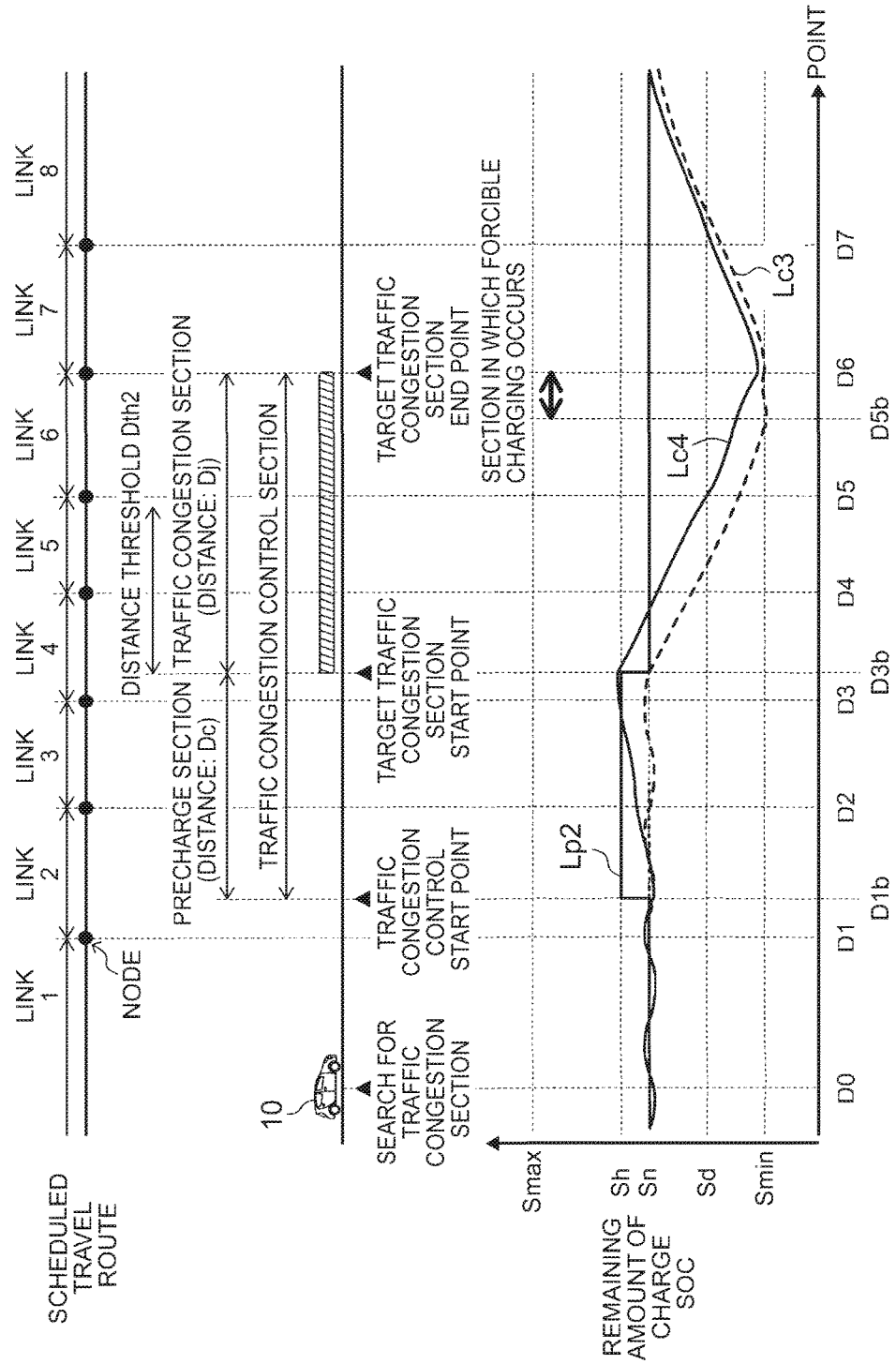
FIG. 4 is a graph that shows a change in remaining amount of charge when the vehicle travels on a traffic congestion section.

A change in the remaining amount of charge SOC when the vehicle 10 travels on a traffic congestion section will be described with reference to FIG. 4. In FIG. 4, there is traffic congestion in a section from point D3b to point D6. When the above-described downhill control and traffic congestion control (described later) are not executed, the target remaining amount of charge SOC* is set to the normal remaining amount of charge Sn.

A curve Lc3 (dashed line) shows a change in the remaining amount of charge SOC when the vehicle 10 has travelled from link 1 to link 8 without executing traffic congestion control. The remaining amount of charge SOC fluctuates near the normal remaining amount of charge Sn until the vehicle 10 reaches the start point of the traffic congestion section. As the vehicle 10 enters the traffic congestion section, the remaining amount of charge SOC starts decreasing. When the vehicle 10 has reached point D5b in the middle of the traffic congestion section, the remaining amount of charge SOC reaches the lower limit remaining amount of charge Smin.

Therefore, the ECU 40 carries out the forcible charging, with the result that the fuel consumption of the vehicle 10 deteriorates. In addition, as a time during which the remaining amount of charge SOC is kept near the lower limit remaining amount of charge Smin extends, degradation of the storage battery 31 is facilitated.

The ECU 40 executes traffic congestion control for increasing the target remaining amount of charge SOC* by a predetermined amount (the amount of electric power SOS) before the traffic congestion section. When traffic congestion control is executed, the target remaining amount of charge SOC* is set to a high remaining amount of charge Sh. In this example, the difference between the high remaining amount of charge Sh and the normal remaining amount of charge Sn is equal to the amount of electric power SOS corresponding to 5% of the maximum amount of charge (that is, the amount of stored electric power at the time when the remaining amount of charge SOC is 100%) of the storage battery 31 (that is, Sh=Sn+S05). The high remaining amount of charge Sh is also referred to as second remaining amount of charge for the sake of convenience.

Traffic congestion control is started at the time when the vehicle 10 has reached point D1b that is located a predetermined precharge distance Dc before the start point (point D3b) of the traffic congestion section. On the other hand, traffic congestion control ends at the time when the vehicle 10 has reached the start point (point D3b) of the traffic congestion section. The target remaining amount of charge SOC* is changed from the high remaining amount of charge Sh to the normal remaining amount of charge Sn. A change in the target remaining amount of charge SOC* when traffic congestion control is executed is shown by a polygonal line Lp2.

A section including the traffic congestion section and a precharge section is also referred to as traffic congestion control section. The precharge section is a section from the point that is located the precharge distance Dc before the start point of the traffic congestion section to the start point of the traffic congestion section. The precharge distance De is a preset distance, and is a sufficient distance by which the remaining amount of charge SOC is increased by the amount of electric power SOS when the vehicle 10 has travelled that distance.

A change in the remaining amount of charge SOC when traffic congestion control is executed is shown by a curve Lc4 (continuous line). As is understood from the curve Lc4, when the target remaining amount of charge SOC* becomes the high remaining amount of charge Sh, the remaining amount of charge SOC increases and reaches near the high remaining amount of charge Sh. After that, when the vehicle 10 travels on the traffic congestion section, the remaining amount of charge SOC decreases. However, the vehicle 10 ends traveling on the traffic congestion section without the remaining amount of charge SOC reaching the lower limit remaining amount of charge Smin. That is, it is possible to avoid forcible charging through traffic congestion control.

When the vehicle 10 has reached the start point of the traffic congestion control section, the ECU 40 receives a notification from the operation support system 60 (specifically, the arithmetic unit 61) that traffic congestion control should be started. At this time, a process that is executed by the arithmetic unit 61 will be described later. In addition, when the vehicle 10 has reached the start point of the traffic congestion section, the ECU 40 receives a notification from the arithmetic unit 61 that traffic congestion control should be ended. The ECU 40 starts traffic congestion control and, after that, ends traffic congestion control in accordance with these notifications received from the arithmetic unit 61.

The traffic congestion section that is a target of traffic congestion control (target traffic congestion section) is a traffic congestion section in which the remaining amount of charge SOC is estimated to reduce by the amount of electric power S20 as a result of traveling of the vehicle 10 on that section. In this example, the target traffic congestion section is a traffic congestion section in which the distance between the start point and end point of the traffic congestion section is longer than a distance threshold Dth2.

In the example shown in FIG. 4, the section from point D3b to point D6 is a traffic congestion section, the length of the traffic congestion section is Dj, and the distance Dj is longer than the distance threshold Dth2 (that is, Dj>Dth2). Therefore, this traffic congestion section corresponds to the target traffic congestion section. Providing Information from Operation Support System to ECU The arithmetic unit 61 searches for a target downhill section and a target traffic congestion section that are included in the route from the current position Pn to the destination (that is, the scheduled travel route). In the case where a target downhill section is found, when the vehicle 10 has reached the start point of a predeplete section corresponding to the target downhill section or when the vehicle 10 has reached the end point of the target downhill section, the arithmetic unit 61 transmits the above-described notification to the ECU 40. That is, when the vehicle 10 has reached the start point of the downhill control section, the arithmetic unit 61 instructs the ECU 40 to start downhill control. When the vehicle 10 has reached the end point of the downhill control section, the arithmetic unit 61 instructs the ECU 40 to end downhill control.

On the other hand, in the case where a target traffic congestion section is found, when the vehicle 10 has reached the start point of a precharge section corresponding to the target traffic congestion section or when the vehicle 10 has reached the start point of the target traffic congestion section, the arithmetic unit 61 transmits the above-described notification to the ECU 40. That is, when the vehicle 10 has reached the start point of the traffic congestion control section, the arithmetic unit 61 instructs the ECU 40 to start traffic congestion control. When the vehicle 10 has reached the start point of the traffic congestion section, the arithmetic unit 61 instructs the ECU 40 to end traffic congestion control.

During execution of downhill control or during execution of traffic congestion control, the arithmetic unit 61 causes the display of the display device 65 to show text or graphics for informing the driver that downhill control or traffic congestion control is being executed.

Specific Downhill Control and Specific Traffic Congestion Control

Incidentally, there may be a traffic congestion section that is not the target traffic congestion section in the travel route (hereinafter, also referred to as specific traffic congestion section). For example, a traffic congestion section that is shorter than the distance threshold Dth2 is the specific traffic congestion section. Alternatively, a traffic congestion section that is longer than the distance threshold Dth2 but the distance between the current position Pn and the start point of the traffic congestion section is shorter than the precharge distance Dc at the time when the process of searching for a target traffic congestion section is executed is the specific traffic congestion section.

In addition, a traffic congestion section that has occurred after the process of searching for a target traffic congestion section is executed last time is the specific traffic congestion section. Traffic congestion control is not executed for the specific traffic congestion section, so, when the vehicle 10 travels on the specific traffic congestion section, the target remaining amount of charge SOC* is set to the normal remaining amount of charge Sn.

While the vehicle 10 is traveling on the specific traffic congestion section within the predeplete section, when downhill control is executed, that is, when the target remaining amount of charge SOC* is decreased from the normal remaining amount of charge Sn to the low remaining amount of charge Sd, the remaining amount of charge SOC decreases to the low remaining amount of charge Sd in a short time. In addition, while the vehicle 10 travels on the specific traffic congestion section, there is a high possibility that the remaining amount of charge SOC decreases and reaches the lower limit remaining amount of charge Smin. In this case, forcible charging is carried out, so the fuel consumption of the vehicle 10 deteriorates.

Figure 5:
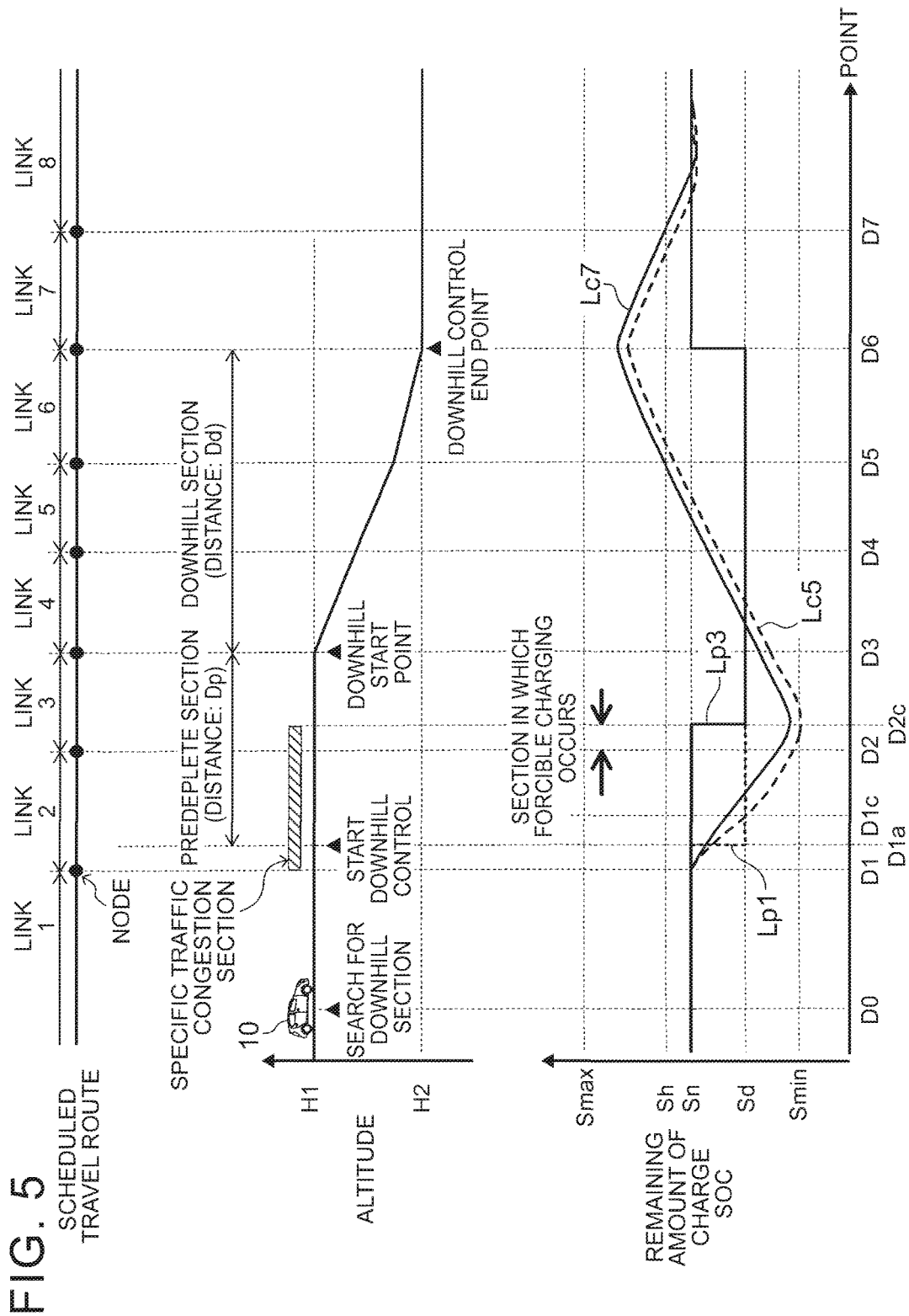
FIG. 5 is a graph that shows a change in remaining amount of charge when specific downhill control is executed.

A curve Lc5 (dashed line) in FIG. 5 shows a change in the remaining amount of charge SOC in the case where there is a specific traffic congestion section (from point D1 to point D2c) before a target downhill section and the target remaining amount of charge SOC* is decreased to the low remaining amount of charge Sd as shown by a polygonal line Lp1 (dashed line in FIG. 5) in the target downhill section. As is understood from the curve Lc5, as a result of a decrease in the target remaining amount of charge SOC* to the low remaining amount of charge Sd, the remaining amount of charge SOC rapidly decreases while the vehicle 10 travels from point D1a to point D1c. After that, the vehicle 10 reaches the lower limit remaining amount of charge Smin at point D2. As a result, forcible charging occurs, so the fuel consumption of the vehicle 10 deteriorates.

On the other hand, while the vehicle 10 is traveling on the specific traffic congestion section within the precharge section, when traffic congestion control is executed, that is, when the target remaining amount of charge SOC* is increased from the normal remaining amount of charge Sn to the high remaining amount of charge Sh, the remaining amount of charge SOC increases in response to the difference between the remaining amount of charge SOC and the target remaining amount of charge SOC*. At this time, the vehicle 10 is traveling on the traffic congestion section, so the engine 23 is operated in a state where the engine load is small, that is, in a state where the operation efficiency of the engine 23 is low. Therefore, the fuel consumption of the vehicle 10 deteriorates.

Figure 6:
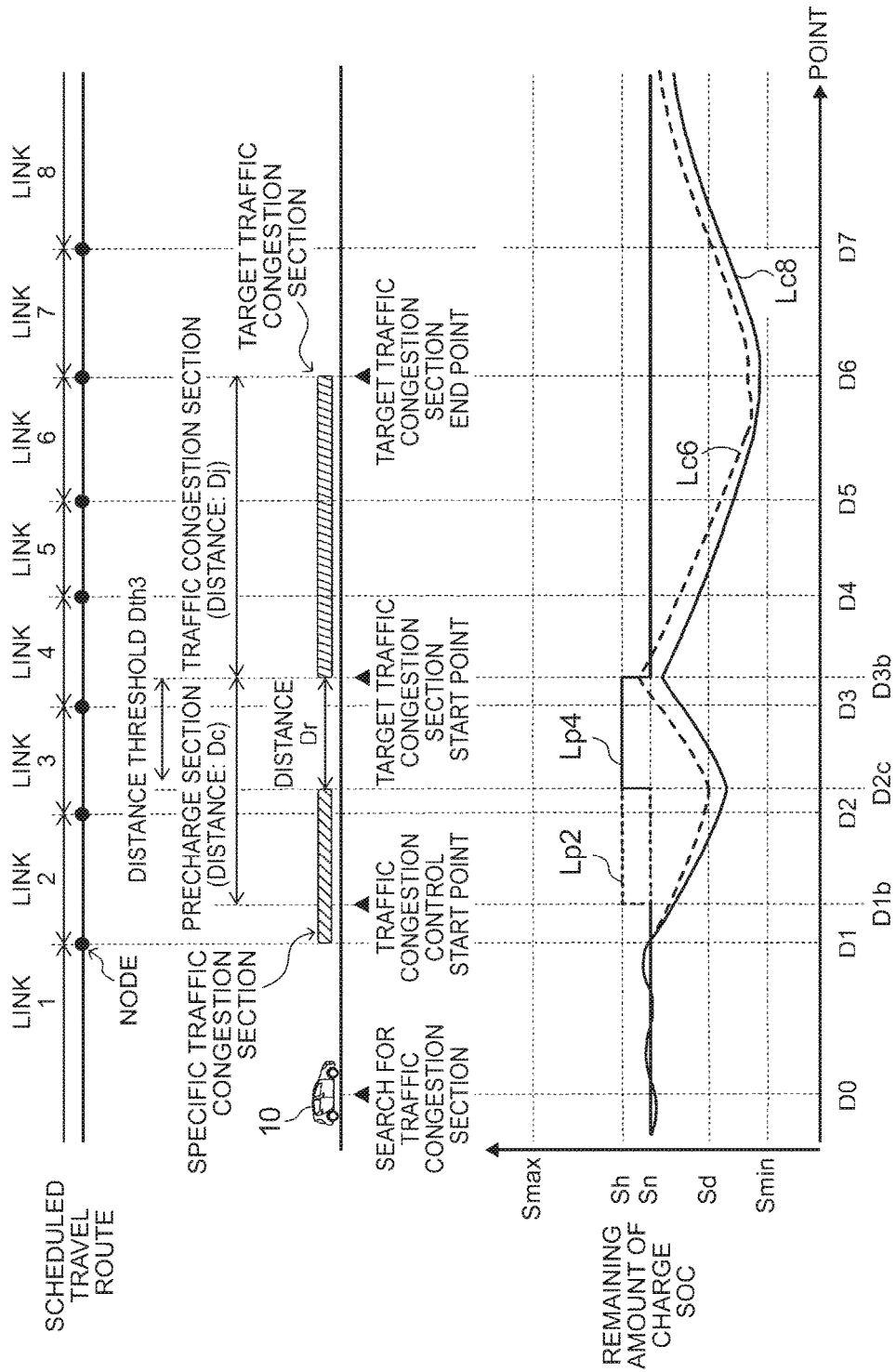
FIG. 6 is a graph that shows a change in remaining amount of charge when specific traffic congestion control is executed.

A curve Lc6 (dashed line) in FIG. 6 shows a change in the remaining amount of charge SOC in the case where there is a specific traffic congestion section before a target traffic congestion section and the target remaining amount of charge SOC* is increased to the high remaining amount of charge Sh in the precharge section as shown by a polygonal line Lp2 (dashed line in FIG. 6). As is understood from the curve Lc6, as a result of an increase in the target remaining amount of charge SOC* to the high remaining amount of charge Sh, a decrease in the remaining amount of charge SOC when the vehicle 10 travels from point D1b to point D2c becomes gentle. Therefore, the engine 23 is operated in a low efficiency state for the purpose of charging. As a result, the fuel consumption of the vehicle 10 deteriorates.

Therefore, the arithmetic unit 61 does not start downhill control or traffic congestion control when the vehicle 10 is traveling on the specific traffic congestion section at the time when the vehicle 10 has reached the predeplete section or the precharge section. That is, the arithmetic unit 61 does not transmit, to the ECU 40, the above-described notification for causing the ECU 40 to start downhill control or traffic congestion control.

After the vehicle 10 ends traveling on the specific traffic congestion section, when the vehicle 10 is traveling on the predeplete section for downhill control, the arithmetic unit 61 starts downhill control. An example of a change in the target remaining amount of charge SOC* in the case where downhill control is started after the end of traveling on the specific traffic congestion section is shown by a polygonal line Lp3 (continuous line) in FIG. 5. A process in which downhill control is started after the end of traveling on the specific traffic congestion section is also referred to as specific downhill control for the sake of convenience.

The reason why downhill control is executed after the end of traveling on the specific traffic congestion section is that, even when the remaining amount of charge SOC that has decreased as a result of traveling on the specific traffic congestion section is not increased to the normal remaining amount of charge Sn by using the output power of the engine 23 (that is, even when the remaining amount of charge SOC is a value near the low remaining amount of charge Sd), the remaining amount of charge SOC is allowed to be increased as a result of traveling on the downhill section thereafter.

An example of a change in the remaining amount of charge SOC in the case where downhill control is executed after the end of traveling on the specific traffic congestion section is shown by a curve Lc7 (continuous line) in FIG. 5. As is understood from the curve Lc7, a decrease in the remaining amount of charge SOC while the vehicle 10 travels from point D1a to point D1c becomes gentle, with the result that the remaining amount of charge SOC is avoided from reaching the lower limit remaining amount of charge Smin.

On the other hand, after the end of traveling on the specific traffic congestion section, when the vehicle 10 is traveling on the precharge section for traffic congestion control and a distance Dr to the start point of the target traffic congestion section is sufficiently long, it is possible to increase the remaining amount of charge SOC to some extent while the vehicle 10 is traveling on a section of the distance Dr, so the arithmetic unit 61 executes traffic congestion control.

The distance between the end point (point D2c) of the specific traffic congestion section shown in FIG. 6 and the start point (point D3b) of the target traffic congestion section is longer than a distance threshold Dth3, so traffic congestion control is started when the vehicle 10 has reached the end point of the specific traffic congestion section. A change in the target remaining amount of charge SOC* in this case is shown by a polygonal line Lp4 (continuous line) in FIG. 6. A process in which traffic congestion control is started after the end of traveling on the specific traffic congestion section is also referred to as specific traffic congestion control for the sake of convenience.

After the end of traveling on the specific traffic congestion section, when the distance Dr is short, the arithmetic unit 61 does not execute traffic congestion control. Specifically, when the distance Dr is shorter than the distance threshold Dth3 that is shorter than the distance threshold Dth2 (that is, Dth2>Dth3), the arithmetic unit 61 does not execute traffic congestion control.

An example of a change in the remaining amount of charge SOC in the case where traffic congestion control is executed after the end of traveling on the specific traffic congestion section is shown by a curve Lc8 (continuous line) in FIG. 6. As is understood from the curve Lc8 a decrease in the remaining amount of charge SOC when the vehicle 10 travels from point D1b to point D2c becomes steeper than that of the curve Lc6 because the target remaining amount of charge SOC* is kept not at the high remaining amount of charge Sh but at the normal remaining amount of charge Sn at point D1b. In other words, the amount of fuel that is consumed by the engine 23 for bringing the remaining amount of charge SOC into coincidence with the target remaining amount of charge SOC* (that is, for suppressing a decrease in the remaining amount of charge SOC) is reduced.

In addition, the reason why the arithmetic unit 61 does not execute traffic congestion control when the distance Dr is shorter than the distance threshold Dh3 is as follows. While the vehicle 10 travels on a section of the distance Dr, when the target remaining amount of charge SOC* is increased from the normal remaining amount of charge Sn to the high remaining amount of charge Sh, there is an increased opportunity to operate the engine 23 for increasing the remaining amount of charge SOC. After traveling on the section of the distance Dr, the target remaining amount of charge SOC* returns from the high remaining amount of charge Sh to the normal remaining amount of charge Sti, and there is a reduced opportunity to operate the engine 23. In addition, while the vehicle 10 travels on the section of the distance Dr, text or graphics indicating that traffic congestion control is being executed is shown on the display of the display device 65. After traveling on the section of the distance Dr, the text or graphics disappears.

Therefore, when the distance Dr is short, a time during which the vehicle 10 travels on the section of the distance Dr shortens even when there is traffic congestion, and the engine rotation speed NE increases and the contents shown on the display of the display device 65 change only during a lapse of that shortened time, so there is a concern that the driver experiences a feeling of strangeness. The distance threshold Dh3 is a predetermined value set such that the driver does not experience a feeling of strangeness caused by the above-described change in engine rotation speed NE and change in the contents shown on the display.

Specific Operation—Driving Force Control by ECU

Figure 7:
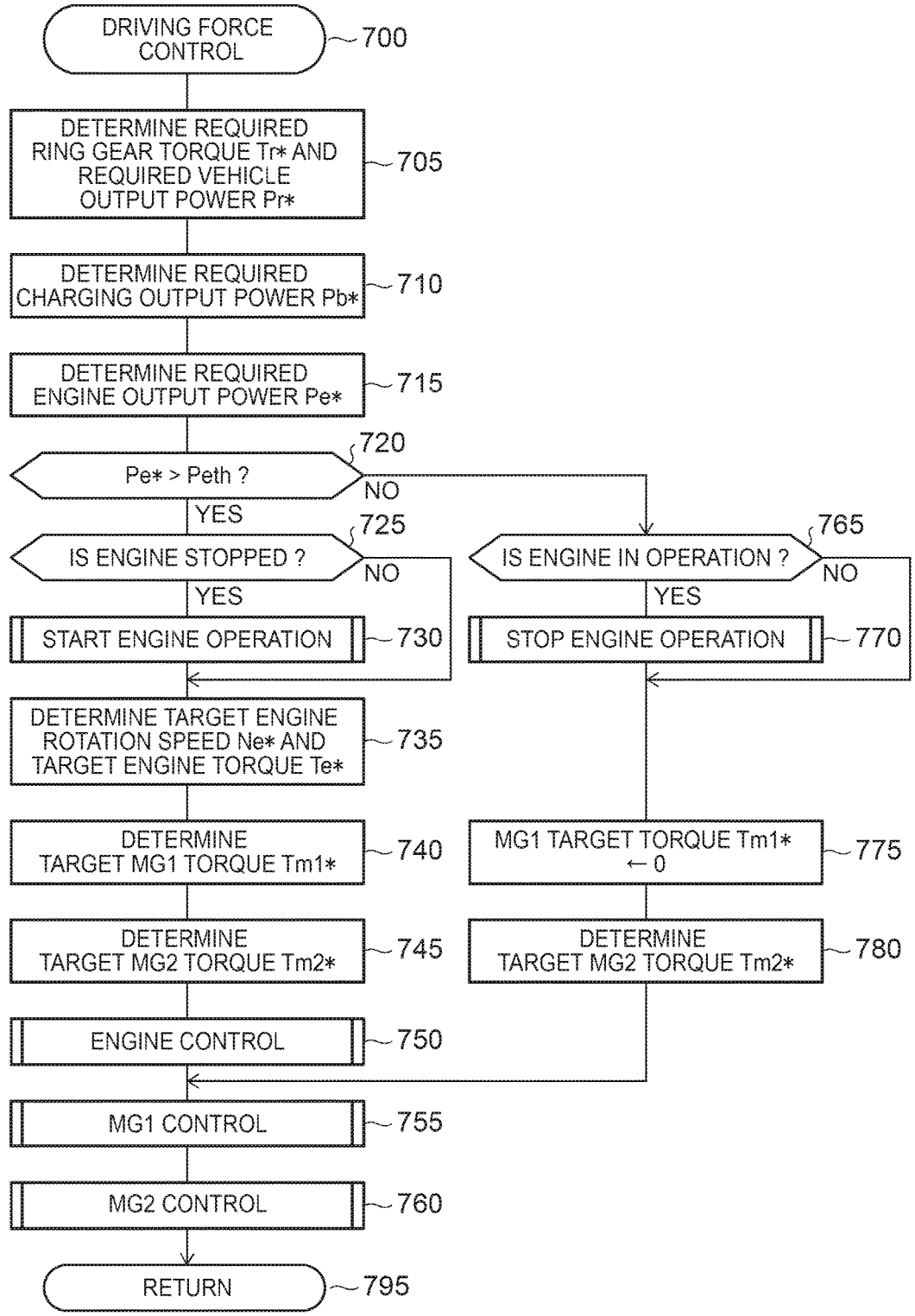
FIG. 7 is a flowchart that shows a driving force control process that is executed by the control apparatus.

Next, the specific operation of the ECU 40 will be described. The CPU 41 (hereinafter, also simply referred to as CPU) of the ECU 40 executes a driving force control routine shown by the flowchart in FIG. 7 each time a predetermined time elapses. Therefore, at adequate timing, the CPU starts the process from step 700 in FIG. 7, sequentially executes the processes of step 705 to step 715 described below, and proceeds to step 720.

In step 705, the CPU determines a required ring gear torque Tr* on the basis of the accelerator operation amount Ap and the vehicle speed Vs, and then determines a required vehicle output power Pr*.

Figure 8:
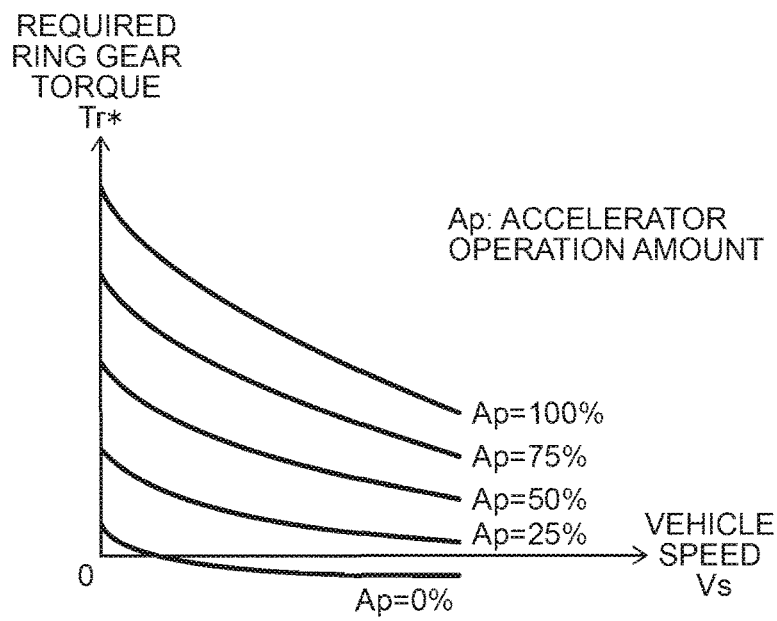
FIG. 8 is a graph that shows the relationship among a vehicle speed, an accelerator operation amount and a required ring gear torque.

The required ring gear torque Tr* is in a linear relationship with torque that acts on the drive wheels 27 and that is required by the driver from the vehicle 10. The CPU determines the required ring gear torque Tr* by applying the accelerator operation amount Ap and the vehicle speed Vs to the relationship between the required ring gear torque Tr* and both the accelerator operation amount Ap and the vehicle speed Vs, shown in FIG. 8. The relationship shown in FIG. 8 is stored in the ROM 42 in the form of a look-up table.

On the other hand, the required vehicle output power Pr* is equal to the product of the required ring gear torque Tr* and the ring gear rotation speed Nr (that is, Pr*=Tr*×Nr). The ring gear rotation speed Nr is in a linear relationship with the vehicle speed Vs.

In step 710, the CPU determines a required charging output power Pb* on the basis of a remaining amount of charge difference ΔSOC (that is, ΔSOC=SOC−SOC*). The remaining amount of charge difference ΔSOC is a difference between the target remaining amount of charge SOC* and a separately calculated actual remaining amount of charge SOC. More specifically, the CPU determines the required charging output power Pb* by applying the remaining amount of charge difference ΔSOC to the relationship between the remaining amount of charge difference ΔSOC and the required charging output power Pb*, shown in FIG. 9. The relationship shown in FIG. 9 is stored in the ROM 42 in the form of a look-up table.

Figure 9:
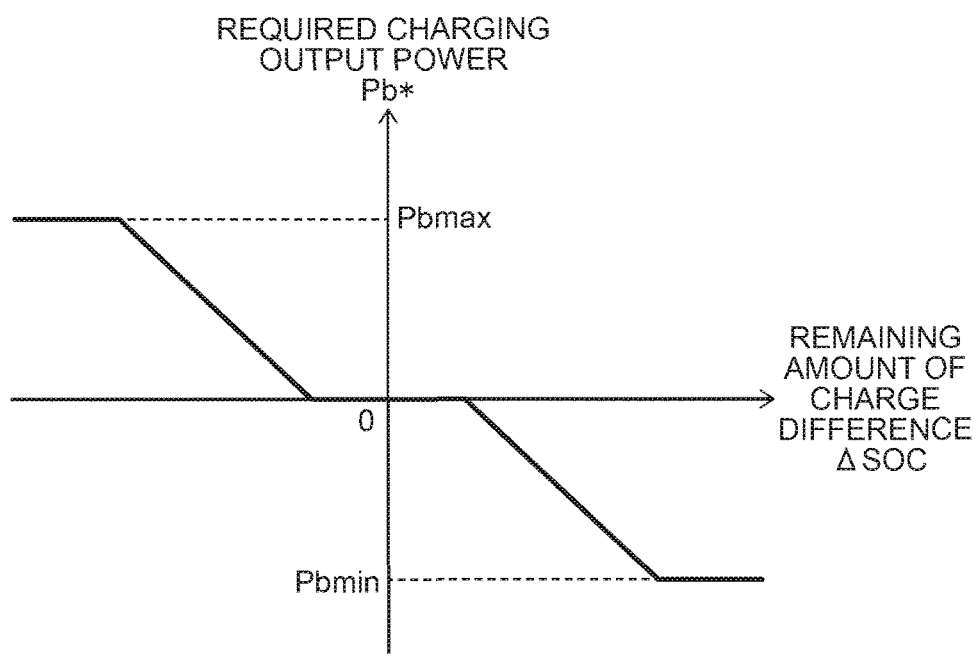
FIG. 9 is a graph that shows the relationship between a remaining amount of charge difference and a required charging output power.

As is understood from FIG. 9, as the remaining amount of charge difference ΔSOC increases, the required charging output power Pb* is set to a smaller value. An upper limit value of the required charging output power Pb* to be set is Pbmax (Pbmax>0), and a lower limit value of the required charging output power Pb* to be set is Pbmin (Pbmin<0). Irrespective of whether downhill control is executed or the value of the remaining amount of charge difference ΔSOC, when the remaining amount of charge SOC is higher than or equal to the upper limit remaining amount of charge Smax, the required charging output power Pb* is set to the lower limit value Pbmin, and, when the remaining amount of charge SOC is lower than or equal to the lower limit remaining amount of charge Smin, the required charging output power Pb* is set to the upper limit value Pbmax.

In step 715, the CPU calculates a required engine output power Pe* by adding a loss Moss to the sum of the required vehicle output power Pr* and the required charging output power Pb* (that is, Pe*=Pr*+Pb*+Ploss).

Subsequently, the CPU proceeds to step 720, and determines whether the required engine output power Pe* is larger than an output power threshold Peth. The output power threshold Peth is set to such a value that, when the engine 23 is operated at an output power smaller than or equal to the output power threshold Peth, die operation efficiency of the engine 23 becomes lower than a predetermined efficiency. In addition, the output power threshold Peth is set such that, when the required charging output power Pb* is set to the upper limit value Pbmax, the required engine output power Pe* becomes larger than the output power threshold Peth.

Case 1: Pe*>Peth

In the case where the required engine output power Pe* is larger than the output power threshold Peth, the CPU makes an affirmative determination in step 720, proceeds to step 725, and determines whether the engine 23 is stopped at the current point in time. When the engine 23 is stopped, the CPU makes an affirmative determination in step 725, proceeds to step 730, and executes the process of starting the operation of the engine 23. Subsequently, the CPU proceeds to step 735. In contrast, when the engine 23 is in operation, the CPU makes a negative determination in step 725, and directly proceeds to step 735.

The CPU sequentially executes the processes of step 735 to step 760 described below. After that, the CPU proceeds to step 795, and once ends the routine.

In step 735, the CPU determines a target engine rotation speed Ne* and a target engine torque Te* such that the output power equal to the required engine output power Pe* is output from the engine 23 and the operation efficiency of the engine 23 is best. That is, the CPU determines the target engine rotation speed Ne* and the target engine torque Te* on the basis of an optimal engine operating point commensurate with the required engine output power Pe*.

In step 740, the CPU determines a target first electric motor rotation speed (target MG1 rotation speed) NM1* on the basis of the ring gear rotation speed Nr and the target engine rotation speed Ne*. More specifically, the CPU calculates the target MG1 rotation speed Nm1* by substituting the ring gear rotation speed Nr and the target engine rotation speed Ne* into the above-described mathematical expression (1). In addition, the CPU determines a target first electric motor torque (target MG1 torque) Tm1* by which the target MG1 rotation speed NM1* is achieved.

In step 745, the CPU calculates a torque shortage that is a difference between the required ring gear torque Tr* and the torque that acts on the ring gear at the time when the torque equal to the target engine torque Te* is generated by the engine 23. In addition, the CPU calculates a target second electric motor torque (target MG2 torque) Tm2* that is a torque that is required to compensate for the torque shortage with the use of the second electric motor 22.

In step 750, the CPU controls the engine 23 such that the engine torque Te that is output from the engine 23 is equal to the target engine torque Te* and the engine rotation speed NE is equal to the target engine rotation speed Ne*.

In step 755, the CPU controls the first inverter 33 such that a torque Tm1 that is generated by the first electric motor 21 is equal to the target MG1 torque Tm1*.

In step 760, the CPU controls the second inverter 34 such that a torque Tm2 that is generated by the second electric motor 22 is equal to the target MG2 torque Tm2*.

Case 2: Pe*≤Peth

In the case where the required engine output power Pe* is smaller than or equal to the output power threshold Peth, when the CPU proceeds to step 720, the CPU makes a negative determination in step 720, proceeds to step 765, and determines whether the engine 23 is in operation at the current point in time.

When the engine 23 is in operation, the CPU makes an affirmative determination in step 765, proceeds to step 770, executes the process of stopping the operation of the engine 23, and then proceeds to step 775. In contrast, when the engine 23 is stopped, the CPU makes a negative determination in step 765, and directly proceeds to step 775.

In step 775, the CPU sets the value of the target MG1 torque Tm1* to zero. In addition, the CPU proceeds to step 780, and calculates the target MG2 torque Tm2* that is a torque that should be generated by the second electric motor 22 in order to bring the torque that acts on the ring gear into coincidence with the required ring gear torque Tr*. Subsequently, the CPU proceeds to step 755 and step 760.

Specific Operation—Search for Controlled Object by Operation Support System

Next, the specific operation of the operation support system 60 will be described. When the driver has input a destination or when the vehicle 10 has passed through the end point of the found target downhill section or found target traffic congestion section, the CPU 66 of the arithmetic unit 61 executes a controlled target searching process routine shown by the flowchart in FIG. 10.

Figure 10:
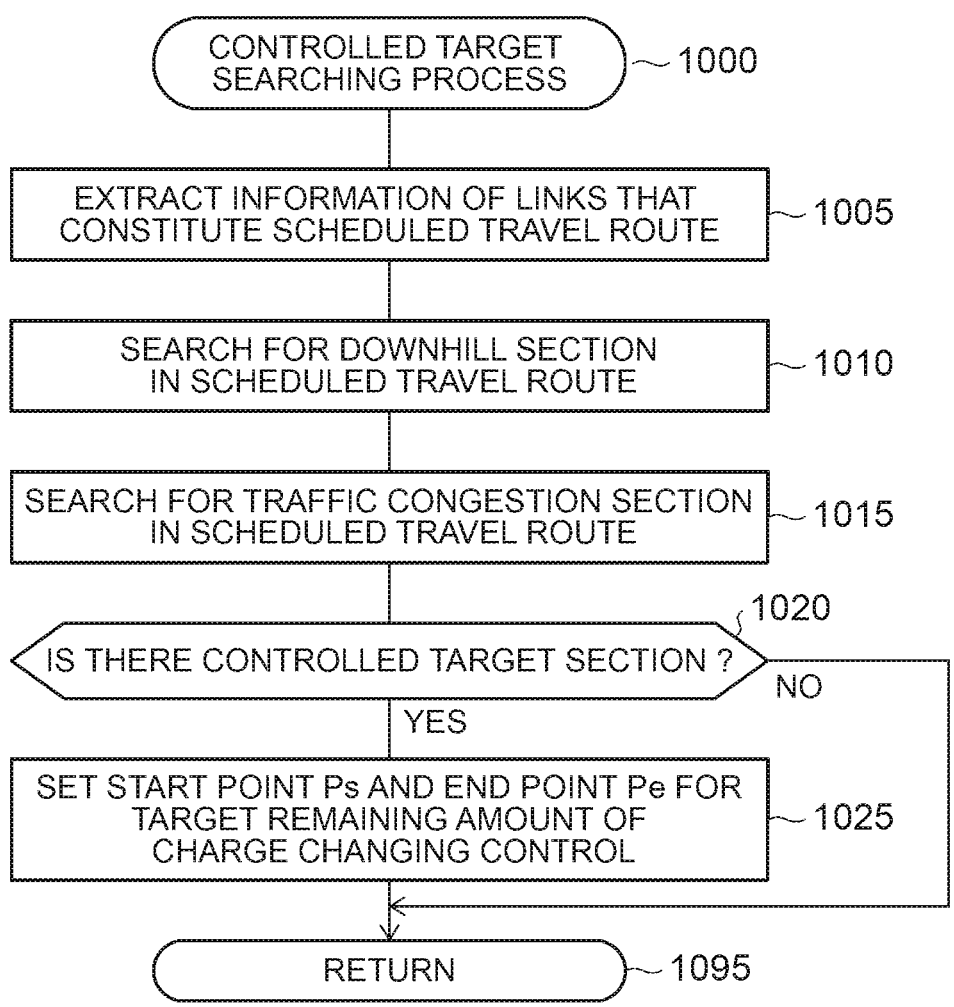
FIG. 10 is a flowchart that shows a controlled target searching process that is executed by the control apparatus.

Therefore, at adequate timing, the CPU 66 starts the process from step 1000 in FIG. 10, proceeds to step 1005, and extracts a scheduled travel route (a combination of links) from the current position Pn to the destination. When the routine is executed for the first time after the destination is input, the CPU 66 determines a scheduled travel route on the basis of the current position Pn and the destination, and extracts a combination of the links of the scheduled travel route.

Subsequently, the CPU 66 proceeds to step 1010, and searches for a closest target downhill section that is farther from a point that is located the predeplete distance Dp from the current position Pn in the scheduled travel route. Subsequently, the CPU 66 proceeds to step 1015, and searches for a closest target traffic congestion section that is farther from a point that is located the precharge distance Dc from the current position Pn in the travel route.

Subsequently, the CPU 66 proceeds to step 1020, and determines whether there is a controlled target section (a target downhill section or a target traffic congestion section). When there is a controlled target section, the CPU 66 makes an affirmative determination in step 1020, proceeds to step 1025, and sets a start point Ps and end point Pe of control for changing the target remaining amount of charge SOC* for the controlled target section.

More specifically, when the controlled target section is a target downhill section, the CPU 66 sets a point that is located the predeplete distance Dp before the start point of the target downhill section for the start point Ps, and the end point of the target downhill section for the end point Pe.

On the other hand, when the controlled target section is a target traffic congestion section, the CPU 66 sets a point that is located the precharge distance Dc before the start point of the target traffic congestion section for the start point Ps, and sets the start point of the target traffic congestion section for the end point Pe. The set start point Ps and end point Pe are stored in the RAM 68. Subsequently, the CPU 66 proceeds to step 1095, and ends the routine.

When there is no controlled target section, the CPU 66 makes a negative determination in step 1020, and directly proceeds to step 1095.

Figure 11:
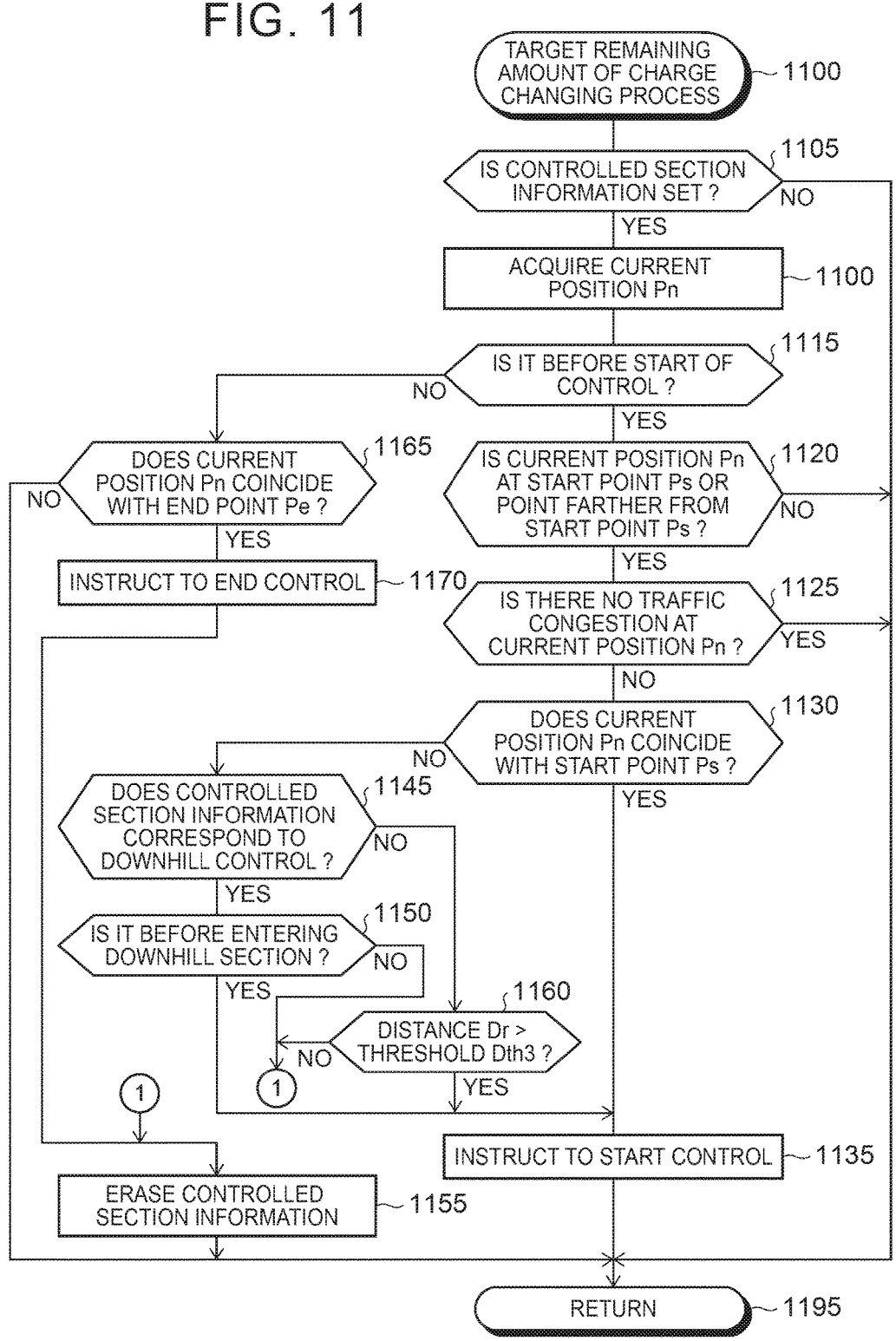
FIG. 11 is a flowchart that shows a target remaining amount of charge changing process that is executed by the control apparatus.

Specific Operation—Change in Target Remaining Amount of Charge by Operation Support System The CPU 66 executes a target remaining amount of charge changing routine shown by the flowchart of FIG. 11 each time a predetermined time elapses in order to execute downhill control and traffic congestion control. Therefore, at adequate timing, the CPU 66 starts the process from step 1100 in FIG. 11, proceeds to step 1105, and determines whether controlled section information (the start point Ps and the end point Pe) for changing the target remaining amount of charge is set.

When the controlled section information is set, the CPU 66 makes an affirmative determination in step 1105, proceeds to step 1110, and acquires the current position Pn acquired by the GPS receiving unit 62. Subsequently, the CPU 66 proceeds to step 1115, and determines whether downhill control or traffic congestion control is already being executed. In other words, the CPU 66 determines whether the target remaining amount of charge SOC* is the normal remaining amount of charge Sn. When downhill control or traffic congestion control is not already being executed, the CPU 66 makes an affirmative determination in step 1115, and proceeds to step 1120.

In step 1120, the CPU 66 determines whether the current position Pn is located at the start point Ps or a point farther from the start point Ps (that is, the current position Pn coincides with the start point Ps or the current position Pn is located between the start point Ps and the destination in the scheduled travel route). When the current position Pn is located before the start point Ps, that is, when the vehicle 10 has not reached the start point Ps, the CPU 66 makes a negative determination in step 1120, proceeds to step 1195, and once ends the routine.

On the other hand, when the current position Pn is located at the start point Ps or a point farther from the start point Ps, the CPU 66 makes an affirmative determination in step 1120, proceeds to step 1125, and determines whether there is traffic congestion at the current position Pn (that is, whether the current position Pn is located in a specific traffic congestion section, more specifically, whether the vehicle 10 is traveling on a traffic congestion section). When there is no traffic congestion at the current position Pn, the CPU 66 makes a negative determination in step 1125, proceeds to step 1130, and determines whether the current position Pn coincides with the start point Ps.

When the current position Pn coincides with the start point Ps (actually, within the range of plus and minus several tens of meters with respect to the start point Ps), the CPU 66 makes an affirmative determination in step 1130, proceeds to step 1135, and instructs the ECU 40 to start control (that is, change the target remaining amount of charge). More specifically, when the start point Ps is the start point of a downhill control section, the ECU 40 changes the target remaining amount of charge SOC* from the normal remaining amount of charge Sn to the low remaining amount of charge Sd. On the other hand, when the start point Ps is the start point of a traffic congestion control section, the ECU 40 changes the target remaining amount of charge SOC* from the normal remaining amount of charge Sn to the high remaining amount of charge Sh. Subsequently, die CPU 66 proceeds to step 1195.

On the other hand, when the current position Pn does not coincide with the start point Ps (that is, when the current position Pn has passed through the start point Ps), the CPU 66 makes a negative determination in step 1130, proceeds to step 1145, and determines whether the registered controlled section information (the start point Ps and the end point Pe) corresponds to downhill control.

When the controlled section information corresponds to downhill control, the CPU 66 makes an affirmative determination in step 1145, proceeds to step 1150, and determines whether the current position Pn is located before entering die target downhill section (that is, whether die current position Pn is located in the predeplete section). When the current position Pn is located before entering the target downhill section, the CPU 66 makes an affirmative determination in step 1150, and proceeds to step 1135.

On the other hand, when the current position Pn is not located before entering die target downhill section, the CPU 66 makes a negative determination in step 1150, proceeds to step 1155, and erases die controlled section information. That is, in this case, downhill control is not executed for this target downhill section. Subsequently, the CPU 66 proceeds to step 1195.

Alternatively, when the controlled section information corresponds to traffic congestion control, the CPU 66 makes a negative determination in step 1145, proceeds to step 1160, and determines whether the distance Dr to the start point of the target traffic congestion section is longer than the distance threshold Dth3. When the distance Dr is longer than the distance threshold Dth3, the CPU 66 makes an affirmative determination in step 1160, and proceeds to step 1135.

On the other hand, when die distance Dr is shorter than or equal to the distance threshold Dth3, the CPU 66 makes a negative determination in step 1160, and proceeds to step 1155. That is, in this case, traffic congestion control is not executed for this target traffic congestion section.

When the routine is executed after downhill control or traffic congestion control is started (that is, during execution of downhill control or traffic congestion control), the CPU 66 makes a negative determination in step 1115, proceeds to step 1165, and determines whether the current position Pn coincides with the end point Pe.

When the current position Pit does not coincide with the end point Pe (that is, when the vehicle 10 has not reached the end point Pe), the CPU 66 makes a negative determination in step 1165, and proceeds to step 1195. On the other hand, when the current position Pn coincides with the end point Pe, the CPU 66 makes an affirmative determination in step 1165, proceeds to step 1170, and instructs the ECU 40 to end control (that is, change the target remaining amount of charge). Specifically, the ECU 40 changes the target remaining amount of charge SOC* from the low remaining amount of charge Sd or the high remaining amount of charge Sh to the normal remaining amount of charge Sn. Subsequently, the CPU 66 proceeds to step 1155.

As described above, the control apparatus (ECU 40 and the operation support system) is applied to a hybrid vehicle (10). The hybrid vehicle includes an internal combustion engine (23) that serves as a drive source of the vehicle, an electric motor (first electric motor 21 and second electric motor 22) that serves as a drive source of the vehicle, and a storage battery (31) that supplies electric power to the electric motor. The hybrid vehicle is configured to perform regenerative braking with the use of the electric motor and be able to charge the storage battery with electric power generated through the regenerative braking. The hybrid vehicle is also configured to be able to charge the storage battery with electric power generated by using output power of the internal combustion engine. The control apparatus includes a control unit. The control unit controls (the flowchart in FIG. 7) the internal combustion engine and the electric motor such that a required driving force that is required of the vehicle is satisfied and a remaining amount of charge (SOC) of the storage battery approaches a target remaining amount of charge (SOC*) set to a normal remaining amount of charge (Sn). The control unit is configured to acquire information pertaining to a scheduled travel route of the vehicle (step 1005 in FIG. 10). The control unit is configured to execute at least one of downhill control and traffic congestion control. The downhill control is control in which, when it is determined on the basis of the information pertaining to the scheduled travel route that a target downhill section that satisfies a predetermined downhill condition is included in the scheduled travel route, the target remaining amount of charge is changed to a first remaining amount of charge (low remaining amount of charge Sd) lower than the normal remaining amount of charge when the vehicle travels on a first section (step 1135 and step 1155 in FIG. 11). The first section at least includes, within a section from a downhill control start point (Ps) that is located a predetermined first distance (distance threshold Dth1) before a start point of the downhill section included in the scheduled travel route to an end point (Pe) of the downhill section, a section from the downhill control start point to the start point of the downhill section. The traffic congestion control is control in which, when it is determined on the basis of the information pertaining to the scheduled travel route that a traffic congestion section that satisfies a predetermined traffic congestion condition is included in the scheduled travel route, the target remaining amount of charge is changed to a second remaining amount of charge (high remaining amount of charge Sh) higher than the normal remaining amount of charge when the vehicle travels on a second section (step 1135 and step 1155 in FIG. 11). The second section is a section from a traffic congestion control start point (Ps) that is located a predetermined second distance (distance threshold Dth2) before a start point of the traffic congestion section included in the scheduled travel route to the start point (Pe) of the traffic congestion section. The control unit is configured to, when the vehicle is traveling on a specific traffic congestion section at the time when the vehicle has reached the downhill control start point or the traffic congestion control start point, not start any of the downhill control and the traffic congestion control (negative determination in step 1020 in FIG. 10). The specific traffic congestion section is a traffic congestion section different from the target traffic congestion section.

In the control apparatus, the control unit is configured to, when the vehicle is traveling on the specific traffic congestion section (negative determination in step 1125 in FIG. 11) at the time when the vehicle has reached the downhill control start point (affirmative determination in step 1120 in FIG. 11) and when the vehicle is not traveling on the specific traffic congestion section before the vehicle passes through the first section for the downhill control start point (affirmative determination in step 1150 in FIG. 11), start the downhill control when a position of the vehicle is located before the start point of the target downhill section, and prohibit execution of the downhill control (step 1155 in FIG. 11) when the position of the vehicle is not located before the start point of the target downhill section (negative determination in step 1150 in FIG. 11).

In the control apparatus, the control unit is configured to, when the vehicle is traveling on the specific traffic congestion section (negative determination in step 1125 in FIG. 11) at the time when the vehicle has reached the traffic congestion control start point (affirmative determination in step 1120 in FIG. 11) and when the vehicle is not traveling on the specific traffic congestion section before the vehicle passes through the second section for the traffic congestion control start point (affirmative determination in step 1150 in FIG. 11), start the traffic congestion control when a position of the vehicle is located a distance longer than a predetermined third distance before the start point of the target traffic congestion section (affirmative determination in step 1160 in FIG. 11), and prohibit execution of the traffic congestion control (step 1155 in FIG. 11) when the position of the vehicle is not located the distance longer than the third distance before the start point of the target traffic congestion section (negative determination in step 1160 in FIG. 11).

With the control apparatus, when a target traffic congestion section is included in the scheduled travel route, there is a high possibility that it is possible to suppress deterioration of fuel consumption by executing traffic congestion control. In addition, when there is a specific traffic congestion section before a target downhill section or a target traffic congestion section, there is a high possibility that it is possible to suppress deterioration of fuel consumption by suspending the start of downhill control or traffic congestion control. Furthermore, after traveling on the specific traffic congestion section, it is possible to appropriately determine whether to start downhill control or whether to start traffic congestion control, so there is a high possibility that the effect of improvement in fuel consumption resulting from downhill control or traffic congestion control is obtained.

The embodiments of the control apparatus for a hybrid vehicle according to the disclosure are described above; however, the disclosure is not limited to the above-described embodiments. The embodiments may be variously modified without departing from the scope of the disclosure. For example, the operation support system 60 in the present embodiments receives signals from GPS satellites. Instead, the operation support system 60 may receive another satellite positioning signal instead of GPS signals or in addition to GPS signals. For example, another satellite positioning signal may be a signal based on a global navigation satellite system (GLONASS) or a quasi-zenith satellite system (QZSS).

The operation support system 60 in the present embodiments receives a VICS signal as traffic congestion information that is provided from the outside of the vehicle 10. Instead, the operation support system 60 may receive traffic congestion information with another method instead of a VICS signal or in addition to a VICS signal. For example, the operation support system 60 may receive traffic congestion information via a mobile communication network (mobile telephone network).

The operation support system 60 may determine on the basis of the vehicle speed Vs, the brake operation amount Bp, and the like, whether the current position Pn is included in a traffic congestion section. For example, when the average of the vehicle speed Vs in a predetermined time is lower than a predetermined value, the operation support system 60 may determine that the current position Pn is included in a traffic congestion section. Alternatively, when a state where the vehicle speed Vs is zero and a state where the vehicle speed Vs is low are alternately repeated in a predetermined time, the operation support system 60 may determine that the current position Pn is included in a traffic congestion section. Alternatively, when a state where the brake operation amount Bp is zero and a state where the brake operation amount Bp is larger than zero are alternately repeated in a predetermined time, the operation support system 60 may determine that the current position Pn is included in a traffic congestion section.

The distance threshold Dth3 in the present embodiments is a fixed value. Instead, the distance threshold Dth3 may be a variable value. For example, the distance threshold Dth3 may change in response to whether the scheduled travel route is an ordinary road or an expressway.

In the example shown in FIG. 3, the traffic congestion section begins from the middle of link 4, and ends in the middle of link 6. That is, each of the start point and end point of the traffic congestion section is in the middle of the corresponding link. Instead, the operation support system 60 may manage information as to whether there is traffic congestion on a link-by-link basis. That is, when there is a traffic congestion section in a link, the operation support system 60 may handle the whole of the link as a traffic congestion section or part of a traffic congestion section.

In the present embodiments, in the case where downhill control is executed, when the vehicle 10 has reached the end point of the downhill section, the target remaining amount of charge SOC* is changed from the low remaining amount of charge Sd to the normal remaining amount of charge Sn. Instead, in the case where downhill control is executed, when the vehicle 10 has reached the start point of the downhill section, the target remaining amount of charge SOC* may be changed from the low remaining amount of charge Sd to the normal remaining amount of charge Sn.

In the present embodiments, after the end of traveling on the specific traffic congestion section, when the vehicle 10 is traveling on the predeplete section for downhill control, downhill control is started. In addition to OF instead of this, after the vehicle 10 ends traveling on the specific traffic congestion section, when the vehicle 10 is traveling on the target downhill section and the distance from the current position of the vehicle 10 to the end point of the target downhill section is longer than or equal to a predetermined distance, downhill control may be started. That is, when it is expected to increase the remaining amount of charge SOC as a result of traveling on a remaining section of the target downhill section, downhill control is executed.

The map database in the present embodiments includes the length and gradient of each link. Instead, the map database may include the altitudes of both ends of each link instead of the gradient of each link.

The map database in the present embodiments is formed of a hard disk drive. Instead, the map database may be formed of a solid state drive (SSD) that uses a storage medium, such as a flash memory.

What is claimed is:

1. A control apparatus that is applied to a hybrid vehicle, the hybrid vehicle including an internal combustion engine that serves as a drive source of the hybrid vehicle, an electric motor that serves as a drive source of the hybrid vehicle, and a storage battery that supplies electric power to the electric motor, the hybrid vehicle being configured to perform regenerative braking with use of the electric motor and to charge the storage battery with electric power generated through the regenerative braking, the hybrid vehicle being also configured to charge the storage battery with electric power generated by using output power of the internal combustion engine, the control apparatus comprising:

a control unit configured to control the internal combustion engine and the electric motor such that a required driving force that is required of the hybrid vehicle is satisfied and a remaining amount of charge of the storage battery approaches a target remaining amount of charge set to a normal remaining amount of charge, wherein the control unit is configured to acquire information pertaining to a scheduled travel route of the hybrid vehicle, the control unit is configured to execute at least one of downhill control and traffic congestion control, the downhill control is control in which, when it is determined on the basis of the information pertaining to the scheduled travel route that a target downhill section that satisfies a predetermined downhill condition is included in the scheduled travel route, the target remaining amount of charge is changed to a first remaining amount of charge lower than the normal remaining amount of charge when the hybrid vehicle travels on a first section, the first section at least includes, within a section from a downhill control start point that is located a predetermined first distance before a start point of the target downhill section included in the scheduled travel route to an end point of the target downhill section, a section from the downhill control start point to the start point of the target downhill section, the traffic congestion control is control in which, when it is determined on the basis of the information pertaining to the scheduled travel route that a target traffic congestion section that satisfies a predetermined traffic congestion condition is included in the scheduled travel route, the target remaining amount of charge is changed to a second remaining amount of charge higher than the normal remaining amount of charge when the hybrid vehicle travels on a second section, the second section is a section from a traffic congestion control start point that is located a predetermined second distance before a start point of the target traffic congestion section included in the scheduled travel route to the start point of the target traffic congestion section, and the control unit is configured to, when the hybrid vehicle is traveling on a specific traffic congestion section at a time when the hybrid vehicle has reached the downhill control start point or the traffic congestion control start point, not start any of the downhill control and the traffic congestion control, and the specific traffic congestion section is a traffic congestion section different from the target traffic congestion section and for which the traffic congestion control is not executed.

2. The control apparatus according to claim 1, wherein the control unit is configured to execute the downhill control, and the control unit is configured to, when the hybrid vehicle is traveling on the specific traffic congestion section at the time when the hybrid vehicle has reached the downhill control start point and the hybrid vehicle is not traveling on the specific traffic congestion section before the hybrid vehicle passes through the first section for the downhill control start point, start the downhill control when a position of the hybrid vehicle is located before the start point of the target downhill section, and prohibit execution of the downhill control when the position of the hybrid vehicle is not located before the start point of the target downhill section.

3. The control apparatus according to claim 1, wherein the control unit is configured to execute the traffic congestion control, and the control unit is configured to, when the hybrid vehicle is traveling on the specific traffic congestion section at the time when the hybrid vehicle has reached the traffic congestion control start point and when the hybrid vehicle is not traveling on the specific traffic congestion section before the hybrid vehicle passes through the second section for the traffic congestion control start point, start the traffic congestion control when the position of the hybrid vehicle is located a distance longer than a predetermined third distance before the start point of the target traffic congestion section, and prohibit execution of the traffic congestion control when the position of the hybrid vehicle is not located the distance longer than the third distance before the start point of the target traffic congestion section.

4. The control apparatus according to claim 1, wherein the specific traffic congestion section is shorter than a distance threshold.

5. The control apparatus according to claim 1, wherein the specific traffic congestion section is longer than a distance threshold, and a distance between a current position of the hybrid vehicle and the start point of the target traffic congestion section is shorter than a precharge distance at a time when the control unit executes a process of searching for the target traffic congestion section.

6. The control apparatus according to claim 1, wherein the specific traffic congestion section is a traffic congestion section that has occurred after the control unit has executed a process of searching for the target traffic congestion section a last time.

7. A vehicle control apparatus comprising:

an internal combustion engine that serves as a drive source of a vehicle;

an electric motor that serves as a drive source of the vehicle and that performs regenerative braking;

a storage battery that supplies electric power to the electric motor, that is charged with electric power generated through the regenerative braking and that is charged with electric power generated by using output power of the internal combustion engine; and a control unit configured to control the internal combustion engine and the electric motor such that a required driving force that is required of the vehicle is satisfied and a remaining amount of charge of the storage battery approaches a target remaining amount of charge set to a normal remaining amount of charge, wherein the control unit is configured to acquire information pertaining to a scheduled travel route of the vehicle, the control unit is configured to execute at least one of downhill control and traffic congestion control, the downhill control is control in which, when it is determined on the basis of the information pertaining to the scheduled travel route that a target downhill section that satisfies a predetermined downhill condition is included in the scheduled travel route, the target remaining amount of charge is changed to a first remaining amount of charge lower than the normal remaining amount of charge when the vehicle travels on a first section, the first section at least includes, within a section from a downhill control start point that is located a predetermined first distance before a start point of the target downhill section included in the scheduled travel route to an end point of the target downhill section, a section from the downhill control start point to the start point of the target downhill section, the traffic congestion control is control in which, when it is determined on the basis of the information pertaining to the scheduled travel route that a target traffic congestion section that satisfies a predetermined traffic congestion condition is included in the scheduled travel route, the target remaining amount of charge is changed to a second remaining amount of charge higher than the normal remaining amount of charge when the vehicle travels on a second section, the second section is a section from a traffic congestion control start point that is located a predetermined second distance before a start point of the target traffic congestion section included in the scheduled travel route to the start point of the target traffic congestion section, and the control unit is configured to, when the vehicle is traveling on a specific traffic congestion section at a time when the vehicle has reached the downhill control start point or the traffic congestion control start point, not start any of the downhill control and the traffic congestion control, and the specific traffic congestion section is a traffic congestion section different from the target traffic congestion section and for which the traffic congestion control is not executed.

8. The vehicle control apparatus according to claim 7, wherein the control unit is configured to execute the downhill control, and the control unit is configured to, when the vehicle is traveling on the specific traffic congestion section at the time when the vehicle has reached the downhill control start point and the vehicle is not traveling on the specific traffic congestion section before the vehicle passes through the first section for the downhill control start point, start the downhill control when a position of the vehicle is located before the start point of the target downhill section, and prohibit execution of the downhill control when the position of the vehicle is not located before the start point of the target downhill section.

9. The vehicle control apparatus according to claim 7, wherein the control unit is configured to execute the traffic congestion control, and the control unit is configured to, when the vehicle is traveling on the specific traffic congestion section at the time when the vehicle has reached the traffic congestion control start point and when the vehicle is not traveling on the specific traffic congestion section before the vehicle passes through the second section for the traffic congestion control start point, start the traffic congestion control when the position of the vehicle is located a distance longer than a predetermined third distance before the start point of the target traffic congestion section, and prohibit execution of the traffic congestion control when the position of the vehicle is not located the distance longer than the third distance before the start point of the target traffic congestion section.

10. The vehicle control apparatus according to claim 7, wherein the specific traffic congestion section is shorter than a distance threshold.

11. The vehicle control apparatus according to claim 7, wherein the specific traffic congestion section is longer than a distance threshold, and a distance between a current position of the vehicle and the start point of the target traffic congestion section is shorter than a precharge distance at a time when the control unit executes a process of searching for the target traffic congestion section.

12. The control apparatus according to claim 7, wherein the specific traffic congestion section is a traffic congestion section that has occurred after the control unit has executed a process of searching for the target traffic congestion section a last time.

* * * * *